(12) United States Patent
Liao et al.

(10) Patent No.: US 9,454,280 B2
(45) Date of Patent: Sep. 27, 2016

(54) DISPLAY DEVICE PROVIDING FEEDBACK BASED ON IMAGE CLASSIFICATION

(75) Inventors: Ting-Yee Liao, Webster, NY (US); Kenneth Alan Parulski, Rochester, NY (US); Timothy L. Nichols, Spencerport, NY (US)

(73) Assignee: INTELLECTUAL VENTURES FUND 83 LLC, Las Vegas, NV (US)

( * ) Notice: Subject to any disclaimer, the term of this patent is extended or adjusted under 35 U.S.C. 154(b) by 675 days.

(21) Appl. No.: 13/220,042

(22) Filed: Aug. 29, 2011

(65) Prior Publication Data

US 2013/0055088 A1    Feb. 28, 2013

(51) Int. Cl.
 *G06F 3/048* (2013.01)
 *G06F 3/0484* (2013.01)
 *H04N 1/00* (2006.01)

(52) U.S. Cl.
 CPC ............. *G06F 3/048* (2013.01); *G06F 3/0484* (2013.01); *H04N 1/00153* (2013.01); *H04N 1/00161* (2013.01); *H04N 1/00167* (2013.01); *H04N 1/00183* (2013.01)

(58) Field of Classification Search
 CPC .............................. G06F 3/048; G06F 3/0484
 USPC .......................................... 715/730, 810, 835
 See application file for complete search history.

(56) References Cited

U.S. PATENT DOCUMENTS

| | | | |
|---|---|---|---|
| 4,754,271 A | 6/1988 | Edwards | |
| 5,537,618 A | 7/1996 | Boulton et al. | |
| 5,657,461 A | 8/1997 | Harkins et al. | |
| 5,721,897 A | 2/1998 | Rubinstein | |
| 5,993,048 A | 11/1999 | Banks et al. | |
| 6,085,201 A | 7/2000 | Tso | |
| 6,282,317 B1 | 8/2001 | Lou et al. | |
| 6,366,782 B1 | 4/2002 | Fumarolo et al. | |
| 6,504,951 B1 | 1/2003 | Lou et al. | |
| 6,509,910 B1 | 1/2003 | Agarwal et al. | |
| 6,629,104 B1 | 9/2003 | Parulski et al. | |
| 6,697,502 B2 | 2/2004 | Lou | |
| 6,810,146 B2 | 10/2004 | Loui et al. | |

(Continued)

FOREIGN PATENT DOCUMENTS

EP    2 259 218    12/2010

OTHER PUBLICATIONS

"What is Framechannel?" http://www.thinkingscreen.com/framechannel.html.

(Continued)

*Primary Examiner* — William Bashore
*Assistant Examiner* — Gregory A Distefano

(57) ABSTRACT

A digital image display device comprising: a display screen; a processor; a network connection for receiving digital media assets provided by a plurality of individuals; an image memory; a user interface for receiving input from a user of the digital image display device; and a program memory. The program memory stores instructions to execute the steps of: receiving a digital media asset; displaying the received digital media asset on the display screen; determining an asset classification for the displayed digital media asset; selecting a set of classified feedback message choices responsive to the determined asset classification; displaying the selected set of feedback message choices, receiving input from the user to select a particular feedback message choice; and providing an indication of the selected feedback message to the individual who provided the displayed digital media asset.

20 Claims, 13 Drawing Sheets

(56) References Cited

U.S. PATENT DOCUMENTS

| | | |
|---|---|---|
| 7,080,124 B1 | 7/2006 | Shankar |
| 7,120,586 B2 | 10/2006 | Loui et al. |
| 7,155,679 B2 | 12/2006 | Bandaru et al. |
| 7,360,151 B1 | 4/2008 | Froloff |
| 7,475,109 B1 | 1/2009 | Fletcher et al. |
| 8,392,435 B1 | 3/2013 | Yamauchi |
| 8,903,719 B1 | 12/2014 | Landry et al. |
| 2002/0078152 A1 | 6/2002 | Boone |
| 2002/0087646 A1 | 7/2002 | Hickey et al. |
| 2002/0178228 A1 | 11/2002 | Goldberg |
| 2002/0194341 A1 | 12/2002 | Gupta |
| 2003/0078033 A1 | 4/2003 | Sauer et al. |
| 2004/0008263 A1 | 1/2004 | Sayers et al. |
| 2004/0037460 A1 | 2/2004 | Luo et al. |
| 2004/0174434 A1* | 9/2004 | Walker .............. G06F 17/30265 348/211.3 |
| 2005/0105775 A1 | 5/2005 | Luo et al. |
| 2005/0105776 A1 | 5/2005 | Lou et al. |
| 2005/0125716 A1* | 6/2005 | Cragun et al. ................. 715/512 |
| 2005/0154691 A1 | 7/2005 | Higgins et al. |
| 2006/0004699 A1 | 1/2006 | Lehikoinen et al. |
| 2006/0025091 A1 | 2/2006 | Buford |
| 2006/0036949 A1* | 2/2006 | Moore et al. .................. 715/730 |
| 2006/0129633 A1* | 6/2006 | Potluri et al. .................. 709/203 |
| 2006/0143176 A1* | 6/2006 | Mojsilovic et al. .............. 707/6 |
| 2006/0168543 A1 | 7/2006 | Zaner-Godsey et al. |
| 2006/0170669 A1 | 8/2006 | Walker et al. |
| 2006/0190436 A1 | 8/2006 | Richardson et al. |
| 2006/0224964 A1 | 10/2006 | Schwartz et al. |
| 2006/0294186 A1 | 12/2006 | Nguyen et al. |
| 2007/0082711 A1 | 4/2007 | Zhao et al. |
| 2007/0100948 A1 | 5/2007 | Adams et al. |
| 2007/0124325 A1* | 5/2007 | Moore et al. .................. 707/102 |
| 2007/0250576 A1 | 10/2007 | Kumar et al. |
| 2007/0294246 A1 | 12/2007 | Evans et al. |
| 2008/0141106 A1 | 6/2008 | Wolpe |
| 2008/0165082 A1 | 7/2008 | Manico et al. |
| 2008/0182599 A1 | 7/2008 | Rainisto et al. |
| 2008/0288271 A1* | 11/2008 | Faust ................................ 705/1 |
| 2009/0003569 A1 | 1/2009 | Forbes et al. |
| 2009/0016504 A1 | 1/2009 | Mantell et al. |
| 2009/0030933 A1 | 1/2009 | Brezina et al. |
| 2009/0049413 A1 | 2/2009 | Lehtovirta et al. |
| 2009/0055481 A1 | 2/2009 | Carmel et al. |
| 2009/0077179 A1 | 3/2009 | Bi et al. |
| 2009/0106695 A1 | 4/2009 | Perry et al. |
| 2009/0164394 A1 | 6/2009 | Multerer et al. |
| 2009/0177744 A1 | 7/2009 | Marlow et al. |
| 2009/0240683 A1 | 9/2009 | Lazier et al. |
| 2009/0248516 A1 | 10/2009 | Gross |
| 2009/0249223 A1 | 10/2009 | Barsook et al. |
| 2009/0256780 A1 | 10/2009 | Small et al. |
| 2009/0292814 A1 | 11/2009 | Ting et al. |
| 2009/0299990 A1 | 12/2009 | Setlur et al. |
| 2009/0319914 A1 | 12/2009 | Roseway et al. |
| 2010/0049702 A1 | 2/2010 | Martinez et al. |
| 2010/0070855 A1 | 3/2010 | Parikh |
| 2010/0122174 A1 | 5/2010 | Snibbe et al. |
| 2010/0150332 A1 | 6/2010 | Soo et al. |
| 2010/0159883 A1 | 6/2010 | Pascal et al. |
| 2010/0179801 A1 | 7/2010 | Huynh et al. |
| 2010/0223314 A1 | 9/2010 | Gadel et al. |
| 2010/0248701 A1 | 9/2010 | Vance et al. |
| 2010/0248777 A1 | 9/2010 | Roberts et al. |
| 2010/0293447 A1 | 11/2010 | Kadowaki et al. |
| 2011/0067099 A1 | 3/2011 | Barton et al. |
| 2011/0072096 A1 | 3/2011 | Goldstein et al. |
| 2011/0081007 A1 | 4/2011 | Bar-Yoav |
| 2011/0179385 A1 | 7/2011 | Li et al. |
| 2011/0294525 A1 | 12/2011 | Jonsson |
| 2011/0295878 A1 | 12/2011 | Bennett et al. |
| 2011/0320560 A1 | 12/2011 | Bennett et al. |
| 2012/0064820 A1 | 3/2012 | Bemmel |
| 2012/0137254 A1 | 5/2012 | Cunningham et al. |
| 2012/0219191 A1 | 8/2012 | Benzarti et al. |
| 2012/0239381 A1 | 9/2012 | Heidasch |
| 2012/0239673 A1 | 9/2012 | Yun et al. |
| 2013/0046749 A1* | 2/2013 | Bennett ........................ 707/709 |

OTHER PUBLICATIONS

"IPHOTO Getting Started," published by Apple, Inc., Jun. 2008, 21 pages.

"Picasa Web Album Features," http://picasa.google.com/features.html, retrieved from the internet Nov. 2, 2010, 1 page.

"Pipes—Frequently Asked Questions," http://pipes.yahoo,com/pipes/docs?doc=overview, retrieved from the internet Nov. 2, 2010, 1 page.

Final Office Action on U.S. Appl. No. 13/088,486, mailed Dec. 13, 2013.

FriendFeed—About Us, http://freindfeed.com/about, retrieved from the internet Nov. 2, 2010, 2 pages.

Non-Final Office Action on U.S. Appl. No. 13/220,032, mailed Aug. 23, 2013.

Non-Final Office Action on U.S. Appl. No. 13/088,464, mailed Dec. 3, 2013.

Non-Final Office Action on U.S. Appl. No. 13/088,486, mailed Jul. 12, 2013.

Office Action on U.S. Appl. No. 13/220,032, mailed Dec. 13, 2013.

Non-Final Office Action on U.S. Appl. No. 13/088,473, mailed Apr. 21, 2014.

Final Office Action on U.S. Appl. No. 13/088,464, mailed Jun. 24, 2014.

Non-Final Office Action on U.S. Appl. No. 13/088,486, mailed Jun. 23, 2014.

Final Office Action on U.S. Appl. No. 13/088,486, mailed Dec. 1, 2014.

Final Office Action on U.S. Appl. No. 13/088,486 mailed Oct. 8, 2015.

Non-Final Office Action on U.S. Appl. No. 13/088,473, mailed Jul. 16, 2015.

Non-Final Office Action on U.S. Appl. No. 13/088,486, mailed May 7, 2015.

Non-Final Office Action on U.S. Appl. No. 13/088473, mailed Apr. 23, 2015.

Final Office Action on U.S. Appl. No. 13/088,473, mailed Oct. 20, 2014.

\* cited by examiner

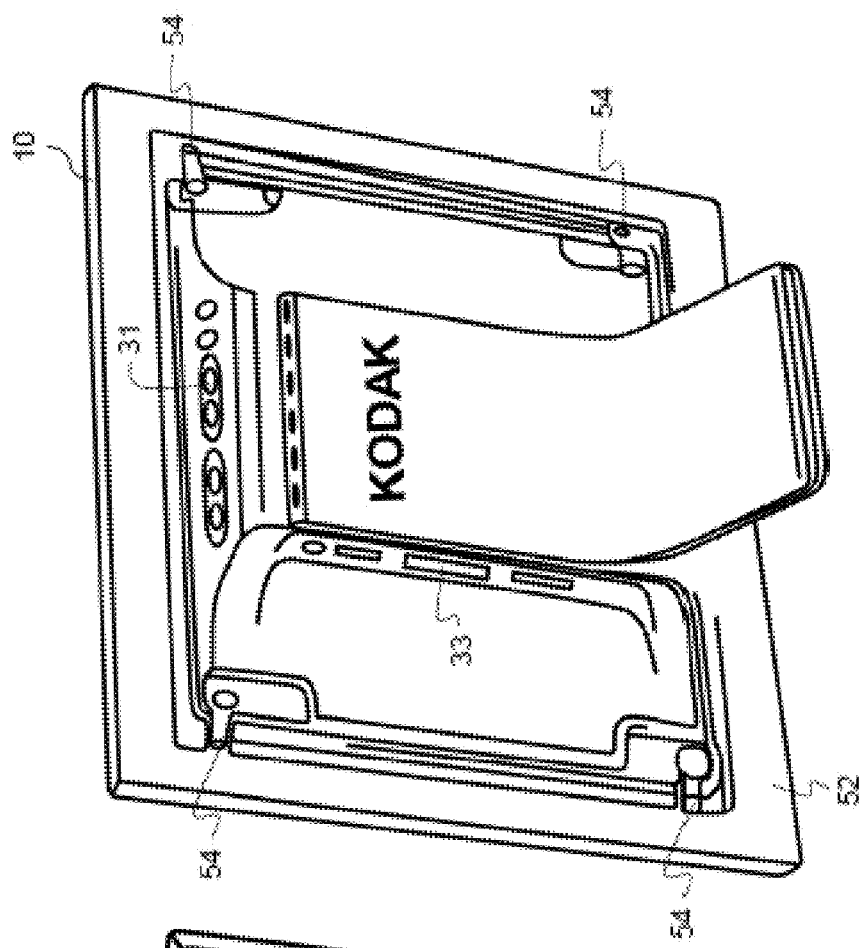
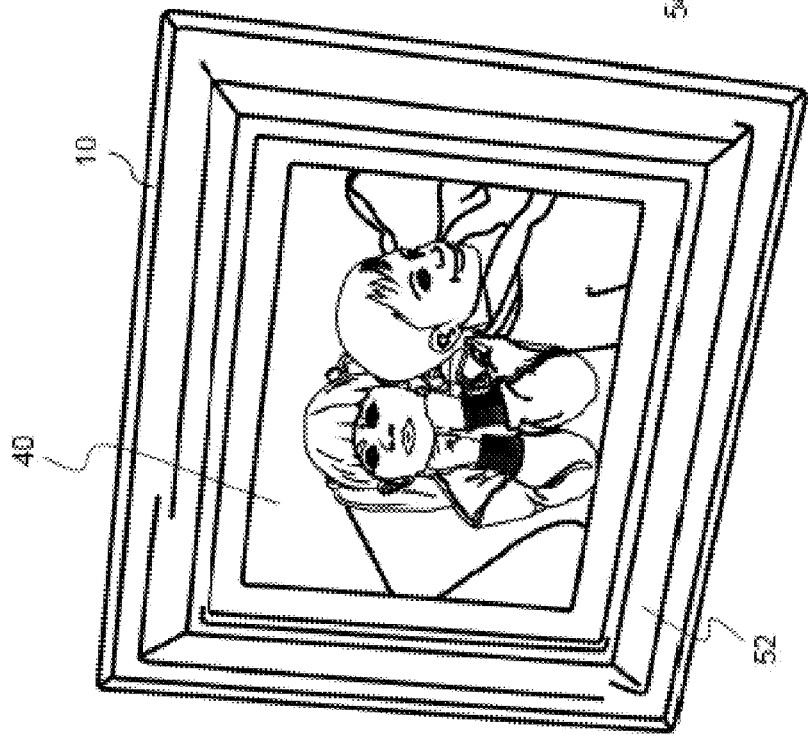
FIG. 2B
FIG. 2A

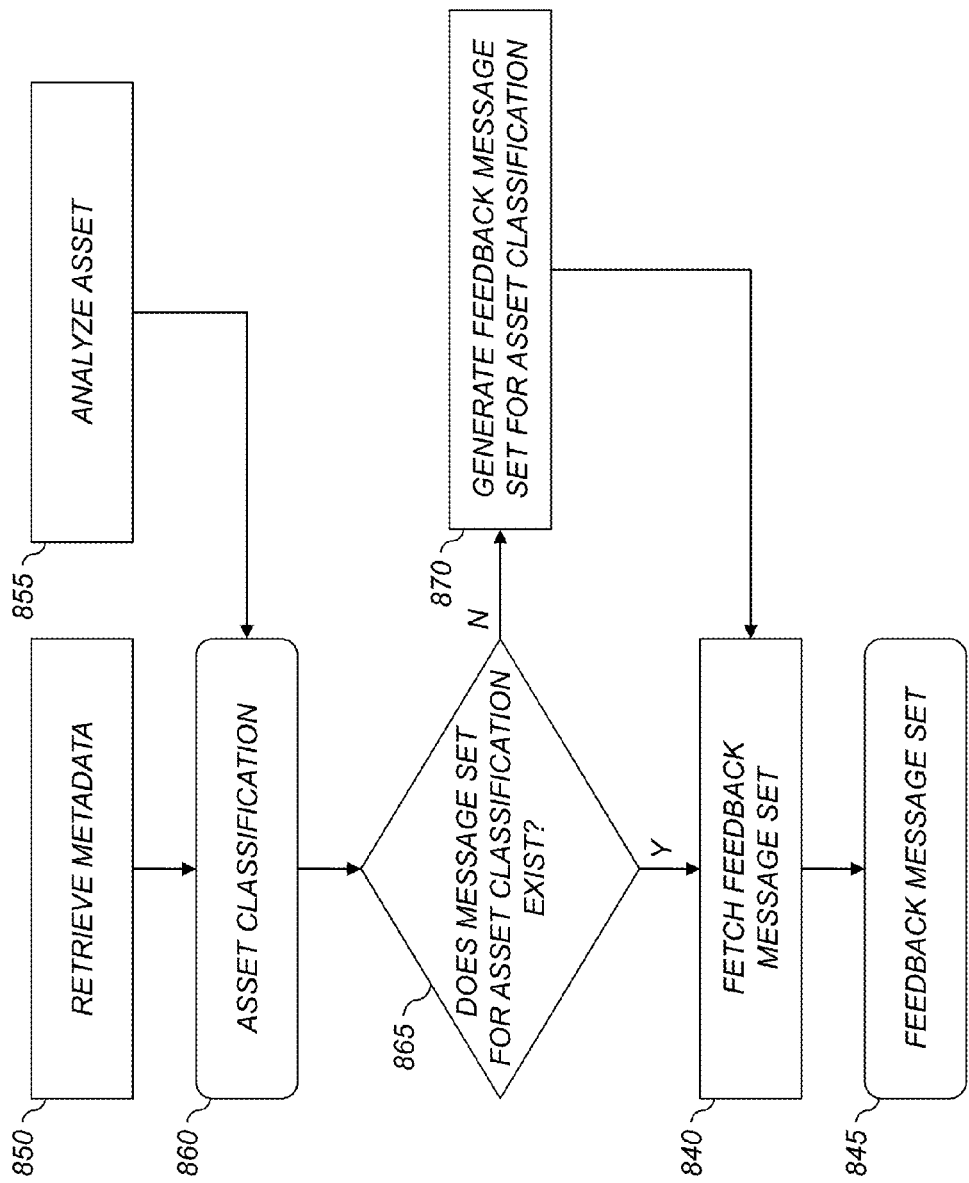

Friend Feedback Message Set

| FEEDBACK CLASS | ICON | FEEDBACK TEXT |
|---|---|---|
| 410A<br>FUNNY | 420A<br> | 430A<br>LOL! |
| 410B<br>BEAUTIFUL | 420B<br> | 430B<br>That's hot! |
| 410C<br>GOOD TIME | 420C<br> | 430C<br>Party on! |
| 410D<br>MEMORABLE | 420D<br> | 430D<br>Such a memorable photo |

400

Family Feedback Message Set

| FEEDBACK CLASS | ICON | FEEDBACK TEXT |
|---|---|---|
| 410A<br>FUNNY | 460A<br> | 470A<br>Really funny! |
| 410B<br>BEAUTIFUL | 460B<br> | 470B<br>This is beautiful |
| 410C<br>GOOD TIME | 460C<br> | 470C<br>What a great day |
| 410D<br>MEMORABLE | 460D<br> | 470D<br>Such a memorable photo |

Nature Scene Feedback Message Set

| FEEDBACK CLASS | ICON | FEEDBACK TEXT |
|---|---|---|
| _410A_<br>FUNNY | <br>_560A_ | _570A_<br>Really funny! |
| _410B_<br>BEAUTIFUL | <br>_560B_ | _570B_<br>Beautiful Scenery |
| _410C_<br>GOOD TIME | <br>_560C_ | _570C_<br>What a great day |
| _410D_<br>MEMORABLE | <br>_560D_ | _570D_<br>Such a memorable view! |

550

Birthday Party Feedback Message Set

| FEEDBACK CLASS | ICON | FEEDBACK TEXT |
|---|---|---|
| _410A_<br>FUNNY | 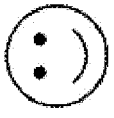<br>_520A_ | _530A_<br>Really funny! |
| _410B_<br>BEAUTIFUL | 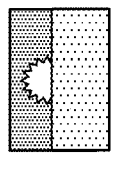<br>_520B_ | _530B_<br>That's Beautiful! |
| _410C_<br>GOOD TIME | 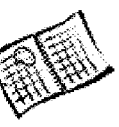<br>_520C_ | _530C_<br>Party on! |
| _410D_<br>MEMORABLE | 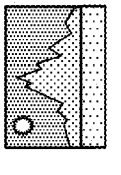<br>_520D_ | _530D_<br>Such a memorable photo |

DISPLAY DEVICE PROVIDING FEEDBACK BASED ON IMAGE CLASSIFICATION

Reference is made to commonly assigned, co-pending U.S. patent application Ser. No. 13/088,464, entitled: "Image display device providing individualized feedback," by Liao et al.; to commonly assigned, co-pending U.S. patent application Ser. No. 13/088,473, entitled: "Image display device providing subject-dependent feedback", by Liao et al.; to commonly assigned, co-pending U.S. patent application Ser. No. 13/088,486, entitled: "Image display device providing feedback messages," by Liao et al.; and to commonly assigned, co-pending U.S. patent application Ser. No. 13/220,032, entitled: "Display device providing individualized feedback," by Liao et al., each of which is incorporated herein by reference.

FIELD OF THE INVENTION

This invention pertains to the field of digital image display devices, and more particularly to digital image display devices that provide feedback for images provided over a network from a variety of sources.

BACKGROUND OF THE INVENTION

A digital media frame (also called a digital photo frame, a digital picture frame or a digital image display device) is a device that electronically stores and displays digital images. As used herein, the term digital image includes both digital still images and digital video images. The digital images are typically captured using digital cameras (still or video), but may also be obtained using other types of digital image sources such as scanners. For example, U.S. Pat. No. 4,754,271 to Edwards, entitled "Liquid Crystal Photograph," describes a device resembling a pocket calculator which stores still pictures in a digital memory cartridge, and displays the pictures on a liquid crystal display (LCD) screen. The device includes an auto-sequencing mode which automatically changes the displayed image after a user-selectable time period, such as 5 seconds, or 5 minutes.

Digital media frames can include a modem to receive digital images over a communications network from computers or other devices, as described in commonly-assigned U.S. Pat. No. 7,155,679 to Bandaru, et al., entitled "Digital Media Frame," which is incorporated herein by reference. Such a digital media frame is commonly known as a "connected frame". This patent further teaches that the connected digital media frame can include an information mode which displays news headlines, stock trading news, weather reports, and advertising received over the communications network.

Some digital media frames can receive digital images over a network from a "share group" which includes a plurality of members, as described in commonly-assigned U.S. Pat. No. 6,509,910 to Agarwal, et al., entitled "Method and system for interfacing with a digital media frame network," which is incorporated herein by reference. This patent teaches that images provided by various sharing members can be downloaded from a network service and automatically displayed on digital media frames which communicate with the network service.

FrameChannel is an Internet service that can be used with a digital media frame having a modem which enables an Internet connection, such as a WiFi modem, that enables communication with an Internet Service Provider (ISP) via a wireless home router. A FrameChannel customer can use a home computer to access the FrameChannel website (www.framechannel.com) in order to customize the content that will be provided to their digital media frame. The customer can select from many different channels of custom content including news, traffic, weather, sports, and financial data. The customer can also use FrameChannel to receive photos from social networking or digital image sharing websites such as Facebook and Flickr, and to receive photos via E-mail and camera phone messages.

Users of digital images may assign metadata to particular images based on emotional or aesthetic judgments of the user, as described in U.S. Pat. No. 6,629,104 to Parulski et. al., entitled "Method for adding personalized metadata to a collection of digital images." This patent describes a software application for adding metadata to a collection of images by configuring and storing a database of pre-assigned metadata labels, displaying images and a menu for selecting the pre-assigned metadata labels, and storing user-selected metadata labels in association with the digital images. The aesthetic categories can include "Favorite" images, "Humorous" images, "Artistic" images, "Emotional" images, "Cute" images, and "Important moment" images. This metadata can be used to help organize the collection of images, and facilitate retrieval of particular images of interest (e.g., "funny" images) at a later date.

The web service Facebook provides a way for individuals to share images either publicly or with friends. When viewing an image, a Facebook user is presented with a user interface allowing the association of a free form textual comment with a given image. The collection of user comments on a given image is available and visible as feedback to the owner of the image as well as other viewers. A Facebook user can select the "like" button, which includes a "thumb up" symbol, to indicate that they like particular images.

Digital media frames can receive images from a variety of individuals. In many cases, the person viewing the received images on the digital media frame would like to provide immediate feedback to the persons who provided the images. Thus, there remains a need for a user of a digital media frame to easily provide immediate feedback to the persons who shared images, and to later utilize this feedback to assist in organizing their image collection.

SUMMARY OF THE INVENTION

The present invention represents a digital image display device for displaying a collection of digital media assets, comprising:
  a display screen;
  a processor;
  a network connection for receiving digital media assets provided by an individual and for providing feedback related to the received digital media assets to the individual;
  an image memory for storing the received digital media assets together with metadata associated with the received digital media assets;
  a user interface for receiving input from a user of the digital image display device; and
  a processor-accessible program memory storing executable instructions for causing the processor to execute the steps of:
    receiving a digital media asset and associated metadata using the network connection and storing the received digital media asset in the image memory;

displaying the received digital media asset on the display screen;

determining an asset classification for the displayed digital media asset;

selecting a particular set of classified feedback message choices responsive to the determined asset classification, wherein different sets of classified feedback message choices are determined for different determined asset classifications, and wherein the individual feedback messages of the different sets of classified feedback message choices are mapped to a common set of feedback classifications;

displaying the particular set of feedback message choices on the display screen, receiving input from the user of the digital image display device via the user interface to select a particular one of the set of feedback message choices; and using the network connection to provide an indication of the selected feedback message to the individual who provided the digital media asset.

This invention has the advantage that the user of the digital image display device can easily send feedback messages that are customized according to an asset classification to individuals who have provided digital media assets to the display device.

It has the additional advantage that the feedback messages can be selected from a set of classified feedback message choices.

It has the further advantage that the feedback classification associated with the selected feedback message can be stored and used as a selection criteria for selecting a subset of the digital media assets.

BRIEF DESCRIPTION OF THE DRAWINGS

FIG. 2A and FIG. 2B depict the front and back of a digital image display device;

FIG. 8B depicts a flow diagram of a method for providing a set of feedback message choices specific to the asset classification for a digital media asset;

FIG. 10A depicts two sets of classified feedback messages, each set applying to a different group of individuals; and FIG. 10B depicts two sets of classified feedback messages, each set applying to a different asset classification.

Figure 1:
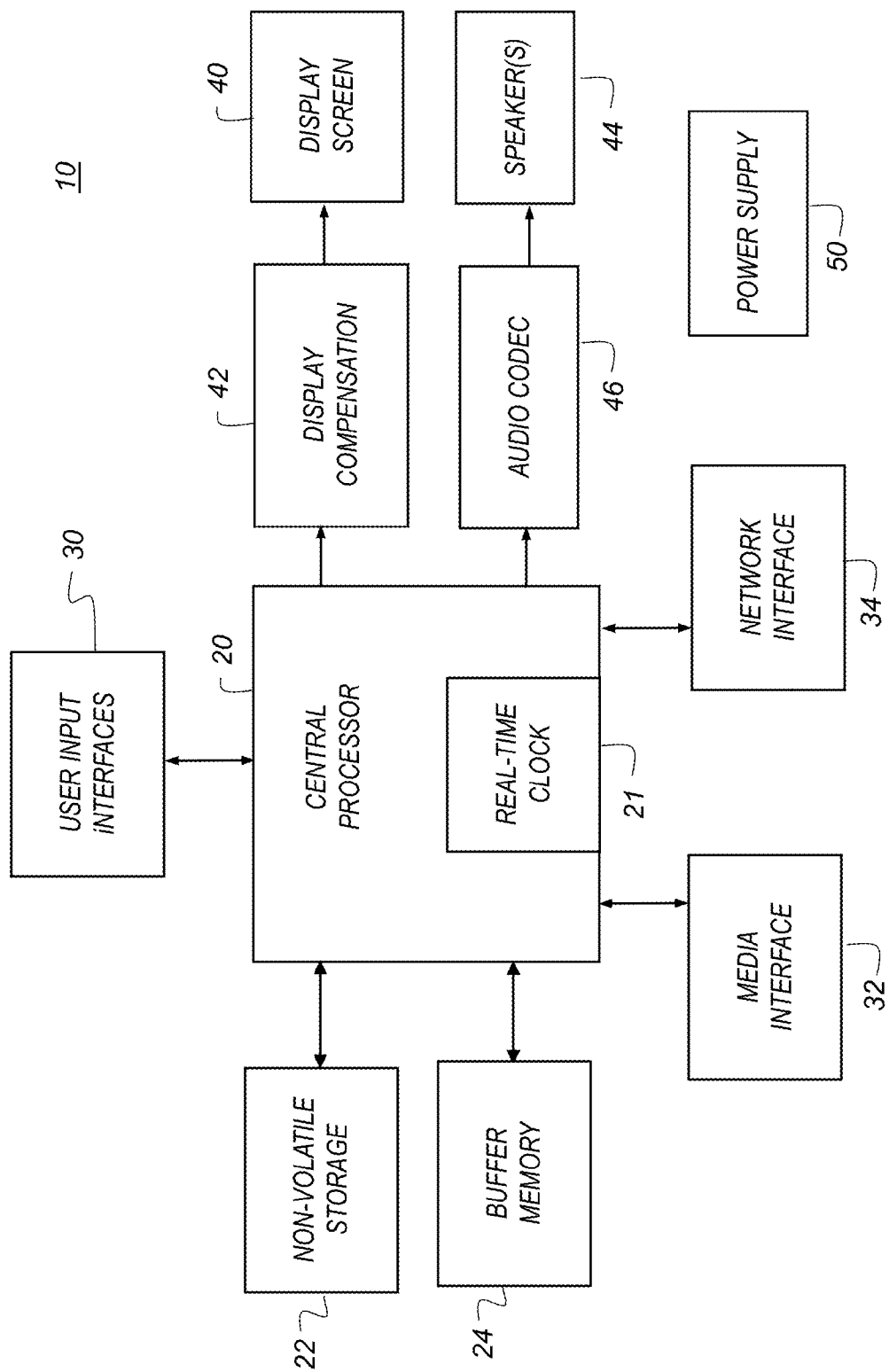
FIG. 1 is a high-level diagram depicting the components of a digital image display device.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory computer readable storage medium, which can include, for example; magnetic storage media such as a magnetic disk (e.g., a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital media frames and related circuitry for providing digital interfaces, digital image storage, digital image processing, and image display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of digital media frames will be familiar to one skilled in the art. It will be obvious that there are many variations of this embodiment that are possible and are selected to reduce the cost, add features or improve the performance of the digital media frame. The present invention is illustrated by way of example and not limitation in the accompanying figures.

FIG. 1 is a high-level block diagram depicting an embodiment of a digital image display device 10. In a preferred embodiment, the digital image display device 10 is a digital media frame (i.e., a digital picture frame or a digital photo frame). However, in other embodiments, the digital image display device 10 can be any device having the ability to display digital media assets on a soft-copy display. Digital media assets would include both digital still images and digital video images. Examples of other types of digital image display devices 10 that can be used in accordance with the present invention would include tablet computers, personal computers, hand-held electronic devices (e.g., smart phones, PDAs or digital media players) and digital televisions. FIG. 2A depicts an embodiment of a front view of the digital image display device 10, and FIG. 2B depicts an embodiment of a rear view of the digital image display device 10. The digital image display device 10 includes a frame surround 52 which can be removed by moving the sliders 54 and replacing the frame surround 52 with a different frame surround, which may have a different color, finish, etc.

The digital image display device 10 allows a user to display digital media assets with minimal user intervention. The digital media assets to be displayed typically include digital still images captured with a digital camera. The digital media assets to be displayed can also include video clips, graphic images, text, and animations. The digital media assets can also include audio information, such as music, speech, and sound effects.

Referring to FIG. 1, a central processor 20 in the digital image display device 10 provides the overall control of the digital image display device 10. The central processor 20 is coupled to a user input interfaces block 30, which enables a user of the digital image display device 10 to select operating modes and images to be displayed. The central processor 20 is also coupled to a media interface block 32, and a network interface block 34, which are used to provide digital media assets to the digital image display device 10. The central processor 20 is also coupled to a non-volatile storage block 22 via an interface, which provides a processor-accessible program memory that stores executable instructions that are used to control the operation of the central processor 20. Non-volatile storage block 22 can also serve as a processor-accessible image memory for storing a collection of digital media assets.

The central processor 20 is also coupled to a buffer memory block 24, which temporarily stores digital media assets for display on display screen 40. The central processor 20 is also coupled to a display compensation block 42, which processes the digital images and provides the compensated digital images to the display screen 40. The central processor 20 is also coupled to an audio codec block 46, which processes digital audio information and converts the digital audio information to one or more analog signals, which are provided to one or more speakers 44.

The user input interfaces block 30 can be provided using various conventional user input devices and circuits. For example, the user input interfaces block 30 can include a group of user buttons 31, such as those provided on the upper back of the digital image display device 10 in FIG. 2B. These user buttons 31 can include, for example, a forward function button, a reverse function button, and a pause function button. The forward function button allows the user to initiate the display of the next image in a playlist, the reverse function button allows the user to initiate the display of the previous image in a playlist, and the pause function button allows the user to initiate the continued display of the current image, until a different function button is pressed by the user. The user buttons 31 can also include a "menu" button, a "select" button" and a number of cursor movement buttons, such as "up," "down," "left" and "right," or some subset thereof. These can be used to select various operating modes.

In some embodiments, the user input interfaces block 30 includes a touch screen interface provided on the front surface of the display screen 40. In some embodiments, the touch screen interface can be implemented using IR emitters and detectors in front of, and parallel to, the display screen 40. A "touch" is detected by determining which IR beams have been blocked by the viewer's finger. In some embodiments, this can be implemented using a relatively small number of emitters and detectors. For example, using 5 emitters spaced vertically and 8 detectors spaced horizontally, enables the detection of 5×8 positions on the display screen. This is enough to allow touch buttons icons to be displayed on the display screen 40 and discern which button icon was touched by the viewer.

In some embodiments, the user input interfaces block 30 includes a touch sensitive input surface that can be positioned adjacent to the display screen 40. For example, the KODAK EASYSHARE P730 Digital Frame includes two "Quick Touch Border" capacitive touch strips, including a horizontally oriented touch strip adjacent the bottom of the display screen 40 and a vertically oriented touch strip adjacent the right side of the display screen 40. Menu items are displayed on the display screen 40 adjacent to these touch strips, and the viewer touches the strip at the appropriate location in order to select menu items. One advantage of the Quick Touch Border is that it keeps fingerprints off of the display screen 40.

In some embodiments, the user input interface can also include a pointing device such as a computer mouse, a joy stick, a track ball, or a track pad. In some embodiments, the user input interface can also include a remote control input device. The remote control can include user inputs which replicate some or all of the functions provided by the user buttons 31. In some embodiments, the user input interface can also include a voice recognition interface (including a microphone and speech recognition processor) or a gesture recognition interface that includes a sensing device (such as a camera) which recognizes user hand gestures or other user movements.

Non-volatile storage block 22 represents non-volatile storage memory, which may include, for example, flash EPROM memory. Non-volatile storage block 22 provides a processor-accessible program memory for storing executable instructions, such as firmware programs, for controlling the operation of the central processor 20.

In some embodiments, the firmware programs stored in non-volatile memory block 22 can be updated or replaced by new firmware provided using the media interface block 32 or the network interface block 34. In some embodiments, other types of non-volatile memory, such as Read Only Memory (ROM), magnetic disk storage or optical disc storage, can be used. In some embodiments, the central processor 20 includes an additional program memory (not shown), and the firmware programs stored in the non-volatile storage block 22 are copied into the program memory before being executed by the central processor 20.

The non-volatile storage block 22 can also be used to provide a processor-accessible image memory for storing a collection of digital media assets such as still images, video clips, sounds music, graphics, text, and other types of content which can be used to create the images displayed on the display screen 40 and the sounds output from speaker(s) 44. These sounds can include sounds captured by the digital still or video camera when the digital images were captured. These sounds can also include sounds (such as audio annotations) captured when the images were previously viewed, either by the user or another individual. These sounds can also include songs or music soundtracks that have been associated with the digital images. In some embodiments, at least some of the stored digital media assets are associated with particular events either automatically as a result of the image capture date, or as a result of manual selection by the user. The sounds can also include audio content associated with the particular events.

The non-volatile storage block 22 also stores auxiliary information (e.g. metadata) associated with the digital media assets. This metadata can include the date and time the image was captured by a digital capture device (e.g., a digital still camera or a digital video camera), or the date and time the image was received by the digital image display device 10. The metadata can also include data which identifies the individual or service that provided the digital media assets that was transferred to the digital image display device 10 using the system to be described later in reference to FIG. 3.

The metadata stored in non-volatile storage block 22 can also include feedback related metadata associated with the digital media assets, such as feedback classifications corresponding to user selected feedback messages. The metadata stored in non-volatile storage block 22 can also include playlists, such as playlists which are created using the feedback classification metadata associated with the digital media assets as selection criteria. These features will be described in more detail later in reference to FIG. 5.

Buffer memory block 24 is a relatively small memory (compared to non-volatile storage block 22) which provides fast memory access for displaying images. The buffer memory block 24 can use, for example, one or more dynamic random access memory ("DRAM") or static random access memory ("SRAM") integrated circuits.

The media interface block 32 receives digital media files from various local external devices, such as removable media devices. For example, the media interface block 32 can include memory card and USB interface connectors 33 (FIG. 2B), to enable the digital image display device 10 to display media files stored on various removable Flash memory cards, such as a Secure Digital (SD) card, a micro SD card, a Compact Flash (CF) card, a MultiMedia Card (MMC), an xD card or a Memory Stick, as well as USB memory "sticks" or "jump drives". The digital media assets stored on these memory devices can be provided by digital computers, digital still cameras, digital video cameras, camera phones, PDAs, print and film scanners, and other types of digital imaging devices. The central processor 20 controls the media interface block 32 in order to transfer media files from the local external devices. The transferred files can be stored in the non-volatile storage block 22, or can be stored directly in the buffer memory block 24 for immediate display on the display screen 40. Thus, the media interface block 32, in combination with the removable memory card or memory "stick", provides a processor-accessible image memory for storing a collection of digital media assets, such as digital images.

The network interface block 34 can be used to enable other devices, such as computers or mobile imaging devices, to transfer digital media files to the digital image display device 10. The network interface block 34 can be provided using a wired interface, such as an Ethernet cable interface or a wired telephone modem. The network interface block 34 can also be provided using a wireless interface, such as a WiFi (e.g. IEEE 802.11 WiFi standard) modem, a cellular modem, or a Bluetooth modem.

In some embodiments, the network interface block 34 provides a direct connection to the Internet, and is configured to read HTML ("HyperText Markup Language") and to use TCP/IP ("Transmission Control Protocol/Internet Protocol"). In other embodiments, the network interface block 34 provides a connection to a local area network, which can then provide an Internet connection using a wired or wireless router or other type of network interface device, which either interfaces directly to the Internet, or to an Internet Service Provider (ISP).

The display compensation block 42 is used to adjust the image data for the characteristics of the display screen 40. This can include tone scale adjustments, color adjustments, sharpness adjustments or any other type of appropriate adjustment. It should be noted that in some embodiments, the display compensation block 42 can be implemented by the central processor 20. In other embodiments, the display compensation block 42 and central processor 20 can be integrated into the same integrated circuit ("IC").

The display screen 40 displays images using a soft-copy display device, such as a color active matrix LCD ("Liquid Crystal Display"). Other types of soft-copy display devices may be used, such as an OLED ("Organic Light Emitting Diode") display, a CRT ("Cathode Ray Tube"), or various silicon-based displays.

A power supply 50 converts the AC power supplied via a wall plug to the proper DC voltages needed to provide power to all of the components of the digital image display device 10. In some embodiments, the power supply can include a re-chargeable battery, so that the digital image display device 10 can be portable, thus allowing it to be used for a period of time without a power cable, and outdoors. In some embodiments, the digital image display device 10 can include a solar panel which is used to charge the rechargeable battery.

In some embodiments, the digital image display device 10 includes a motion sensor (not shown). The motion sensor can provide a signal to the central processor 20, which controls the power supply 50 in order to supply power to the display screen 40 only when motion is detected. This reduces the power wasted when displaying images if there are no viewers in the vicinity of the digital image display device 10.

The central processor 20 runs two primary processes in order to display images and communicate with other system components, as will be described later in reference to FIG. 4A and FIG. 4B. A real-time clock 21 in the central processor 20 provides a date/time value. In some embodiments, the real-time clock 21 is manually configured by the user while in other embodiments, the real-time clock is configured using information accessed on an external device such as a Network Time Protocol (NTP) server using the network interface block 34.

It will be understood that the functions of the central processor 20 can be provided using a single programmable processor or by using multiple programmable processors, including one or more digital signal processor (DSP) devices. Alternatively, the central processor 20 can be provided by custom circuitry (e.g., by one or more custom integrated circuits (ICs) designed specifically for use in digital media frames), or by a combination of programmable processor(s) and custom circuits. It will be understood that connections between the central processor 20 and some of the blocks shown in FIG. 1 can be made using a common data bus. For example, in some embodiments the connection between the central processor 20, the non-volatile storage block 22, the buffer memory block 24, the media interface block 32, and the network interface block 34 can be made using a common data bus.

Figure 3:
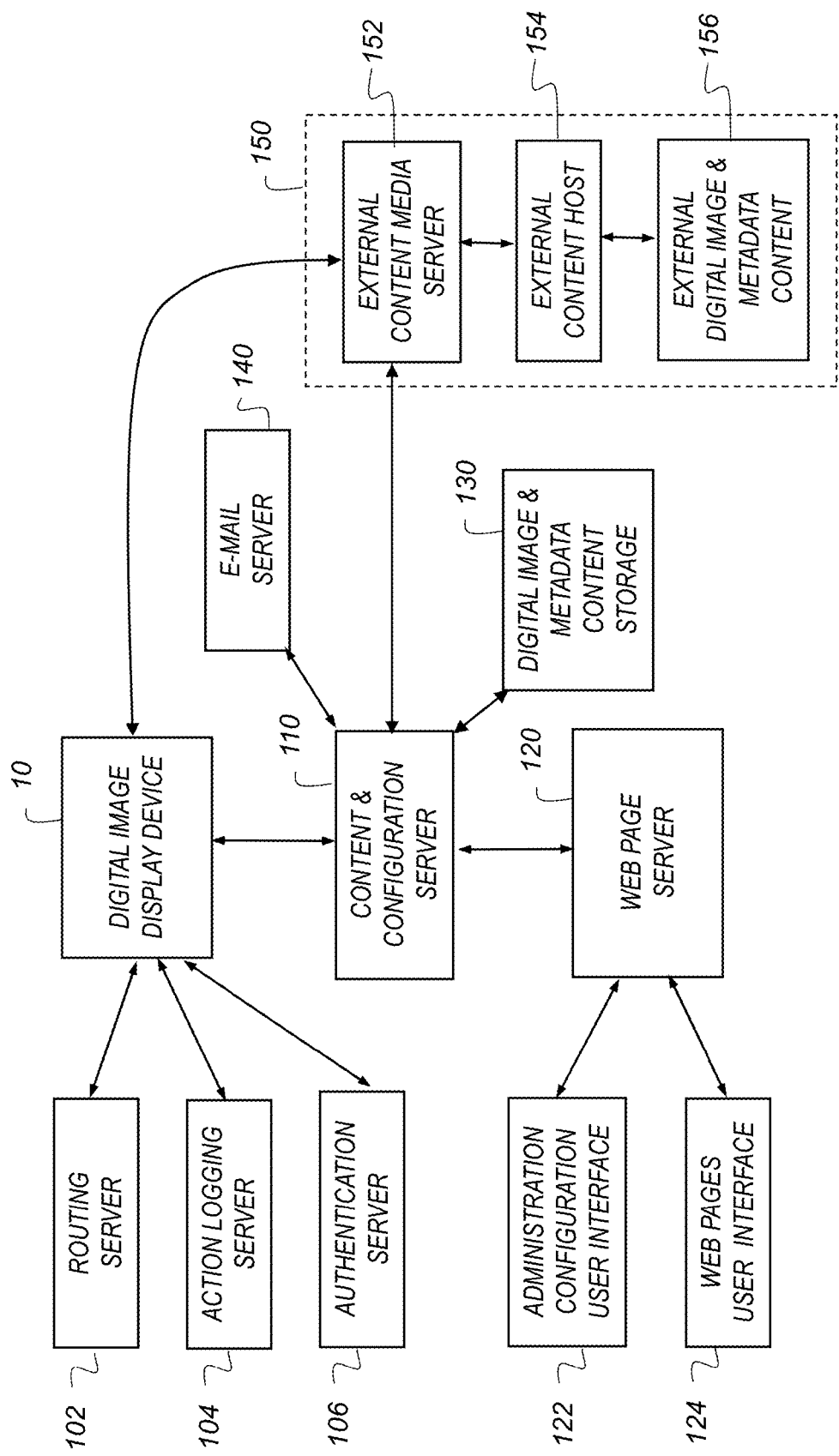
FIG. 3 is a high-level system diagram depicting how the digital image display device of FIG. 1 communicates with other devices to receive content and configuration information.

FIG. 3 is a high-level system diagram depicting an embodiment of how the digital image display device 10 can communicate over a network with other systems to receive content and configuration information. It will be understood that a large number of digital image display device 10 units, located at many different geographically dispersed locations, can be supported by the system depicted in FIG. 3. The digital image display device 10 communicates over a network (such as the Internet) with a routing server 102, an action logging server 104, and an authentication server 106. The digital image display device 10 also communicates over the network with content and configuration server 110. The content and configuration server 110 communicates with a web page server 120. The web page server 120 can be controlled by an administration configuration user interface 122 and a web pages user interface 124. The content and configuration server 110 can obtain digital image and metadata content and store it in digital image and metadata content storage 130. The digital image and metadata content can originate into this system from an E-mail server 140, from the web page server 120 or from one or more content providing systems 150. The content providing systems 150 can provide content from a variety of sources, such as Facebook, Flickr, the Kodak Gallery, and other on-line content storage systems and services (e.g. "cloud" computing and storage systems).

Each content providing system 150 can include an external content media server 152 which communicates with an external content host 154 in order to supply external digital image and metadata content 156. The external digital image and metadata content 156 can be stored on hard drives or other digital storage devices or media that can be accessed by the external content host 154.

In some embodiments, the content and configuration server 110 only provides a list of digital media assets together with appropriate information about each digital media asset. The digital image display device 10 can subsequently access digital media files directly from the content providing systems 150.

It will be understood that the various blocks shown in FIG. 3 can be implemented using different hardware configurations. For example, the routing server 102, action logging server 104 and authentication server 106 can execute on the same physical hardware, or on different hardware. Furthermore, each server, such as routing server 102, may execute on multiple pieces of hardware in order to execute operations in parallel.

Figure 4A:
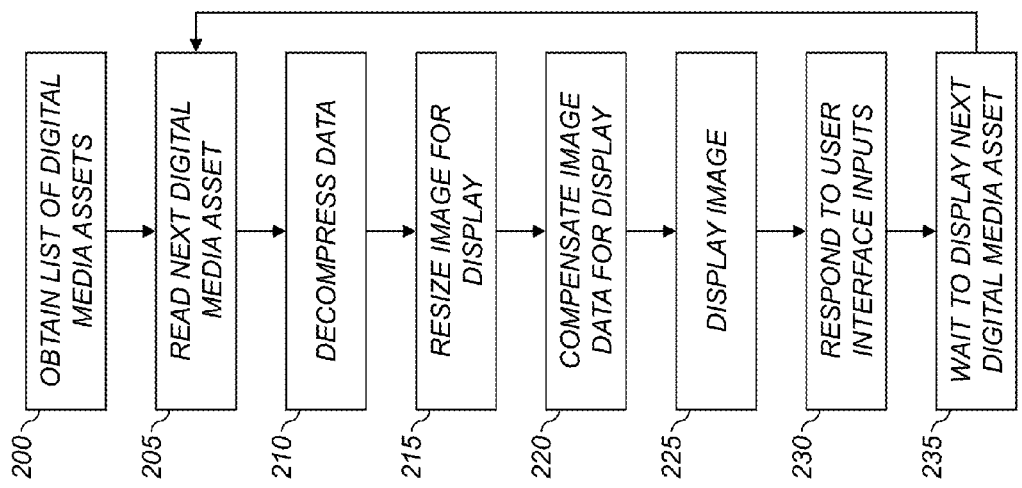
FIG. 4A is a high level flow diagram depicting a general image display process.

FIG. 4A is a high level flow diagram depicting a general image display process performed by the central processor 20 as a foreground process. In obtain list of digital media assets step 200, the central processor 20 gets a list of digital media assets to be displayed from the non-volatile storage block 22 or from some other digital media asset storage location (e.g., storage media connected via the media interface block 32, or a remote storage location accessible via the network interface block 34). A digital media asset is a discrete piece of digital media content such as a digital still image, a digital video clip, a digital audio clip or music file, as well as graphics, text, and other types of content that can be used to create the images displayed on the display screen 40 and the sounds output from speaker(s) 44 of the digital image display device 10. A collection of digital media assets is the set of all the digital media assets that are available for display or playback on the digital image display device 10. A list of digital media assets is a list of the individual digital media assets in the collection of digital media assets. This list can be stored as a formatted text file (e.g. an XML file), as a database or in some other custom storage format. The list can be provided in the display order in which content is to be displayed, or the display order can be specified as a separate field or as a subsequent list referring back to the assets in the list. In some operating modes of the digital image display device 10, the content is intentionally displayed in a randomized order.

In read next digital media asset step 205, the central processor 20 reads the list and determines the next digital media asset to display from the list. The central processor 20 then reads the digital media asset from the non-volatile storage block 22 or the storage media connected to media interface block 32. In some embodiments, the central processor 20 can read the digital media asset from a remote storage site via the network interface block 34.

In decompress data step 210, the central processor 20 decompresses the image data associated with the digital media asset and stores the decompressed image data in the buffer memory block 24. If the digital media asset is a video file, such as an MPEG 2 or MPEG 4 video file, the central processor 20 performs real-time decompression of the compressed video file.

In resize image for display step 215, the central processor 20 scales the image for display, by resizing the image as necessary in order to match the image size (i.e., the display screen resolution) required by display screen 40. In some embodiments, the image size stored in buffer memory block 24 is slightly larger than the screen resolution, in order to allow for some panning/zooming effects as the image is displayed.

In compensate image data for display step 220, the display compensation block 42 applies compensation to the image data before it is provided to the display screen 40. The compensation typically includes adjusting the image to account for the characteristics of the display screen 40 (e.g., an LCD panel). In some embodiments, the compensation may also adapt to the content of the specific image, for example, to provide image-specific enhancements.

In display image step 225, the central processor 20 displays the current image on the display screen 40. The central processor 20 can also display visual messages or user interface controls on the display screen 40, to indicate to the user of the digital image display device 10 various operating modes and options that can be selected by the user. In some embodiments, the central processor 20 provides these messages and controls using an on-screen graphics buffer, which can be stored in a portion of buffer memory block 24. The graphics information provided from this on-screen graphics buffer can be blended with the currently displayed image when the user activates one of the user interface elements of the user input interfaces block 30, such as a touch screen interface. In some embodiments, the text and icons are transparently overlaid on top of the currently displayed image.

In respond to user interface inputs step 230, if the user makes a selection using one of the user input elements, the central processor 20 takes one or more actions in response to the user selection. This can include, for example, changing the display time for images, deleting an image from the collection of digital media assets, selecting a feedback message for the displayed image, or selecting a playlist of digital media assets to be displayed.

In wait to display next digital media asset step 235, the central processor waits until the real-time clock 21 has advanced by a specified time interval between images, and then execution returns to the read next digital media asset step 205. The specified time interval can be a factory default time interval (e.g., 10 seconds per image) or can be a time interval selected by the user using appropriate user interface elements. The central processor 20 also controls the type of transition between images. The transition is a mechanism of "retiring" the current image while "phasing in" the next image. For example, one type of image transition moves the current and next images in one direction (e.g. left to right, or top to bottom) such that the current image moves out while the next image moves in. In another example, the image transition fades out the current image while fading in the next image on top of the current image. Those skilled in the art will recognize that many different types of transitions can also be used.

Figure 4B:
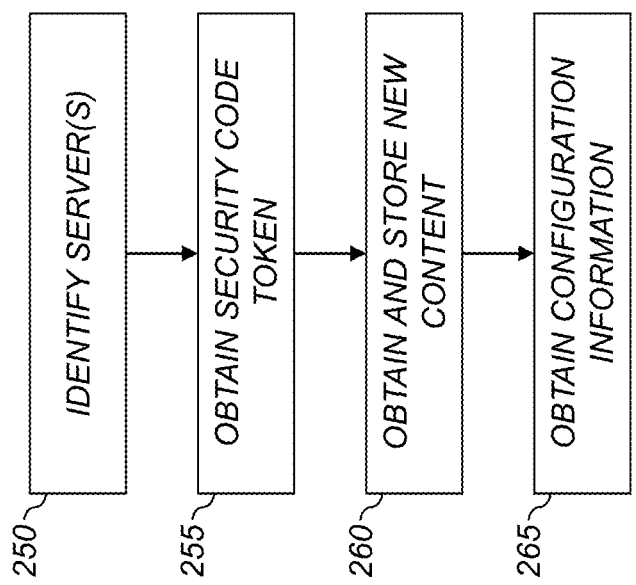
FIG. 4B is a high level flow diagram depicting a general system communications process.

FIG. 4B is a high level flow diagram depicting a general system communications process for secure information exchange over an insecure network, which is performed by the central processor 20 via the network interface block 34 as a background process. In some embodiments, the network interface block 34 is a WiFi wireless interface, which enables the digital image display device 10 to wirelessly communicate with various servers such as routing server 102, action logging server 104, authentication server 106 and content and configuration server 110 over a network, such as the Internet.

At startup, an identify server(s) step 250 is performed, during which the digital image display device 10 interfaces via network interface block 34 over the Internet to the routing server 102 at a known server location, in order to identify itself and determine how to proceed. The routing server 102 returns information to the digital image display device 10 that indicates which server(s) the digital image display device 10 should communicate with for all subsequent functions. The only address that is not allowed to change is the path to this routing server 102.

In obtain security code token step 255, the digital image display device 10 uses a secure communication method (e.g. https://) to query the authentication server 106 for a security code to communicate with the rest of the system. This query involves transmission of private information that is known by both the digital image display device 10 and the authentication server 106. The authentication server 106 generates a temporary security token and returns the token to the digital image display device 10. The token is made available to other parts of the server (and other servers) to allow authentication of the particular digital image display device 10 for future operations.

When the time window for the authentication token expires, any operations from the digital image display device 10 to one of the servers (other than the authentication server 106) will be rejected. In this situation, the digital image display device 10 then communicates with the authentication server 106 in order to acquire a new authentication token, before continuing with other operations. The use of a temporary token for most of the communications between the digital image display device 10 and each of the servers has the advantage of minimizing exposure to the private information shared between the digital image display device 10 and the authentication server 106 and the advantage of minimizing the computation required for subsequent communications by reducing the need for secure communications with a temporary token.

In obtain and store new content step 260, the digital image display device 10 communicates with the content and configuration server 110 in order to retrieve any new content that may be available. The digital image and metadata content provided by the content and configuration server 110 is organized into groups of pictures that are grouped by some combination of the source of the content (e.g., E-mail, Facebook or Kodak Gallery), a unique identifier of the sender of that content (e.g., the E-mail address of the sender who provided the content), and the date and time that the particular content was shared (or the instance of sharing). In some embodiments, a direct network upload sharing method can be used to provide content directly to the digital image display device 10. The direct upload sharing method can make use of various interfaces such as the well-known FTP or REST interfaces.

The digital image and metadata content provided by the content and configuration server 110 may also be organized by other information related to each particular content such as the location where the particular content was captured, keywords associated with the particular content, names or identity of people captured in the particular content, or things captured in the particular content. The digital image and metadata content provided by the content and configuration server 110 may also be organized using the feedback classifications corresponding to selected feedback messages, as will be described later in reference to FIG. 5.

The digital image and metadata content is obtained through a separate interface to content and configuration server 110, and is stored using an appropriate non-volatile storage (not shown) available to the content and configuration server 110. The content and configuration server 110 sends a description of the new content to be stored on the digital image display device 10. The central processor 20 in the digital image display device 10 then individually retrieves each of the digital media assets defined by the content and configuration server 110 and stores each digital media asset in the non-volatile storage block 22 in the digital image display device 10. The digital image display device 10 also transfers metadata related to each digital media asset, such as the sharing method (e.g., E-mail, Facebook or Kodak Gallery), an identifier for the individual providing the digital media asset, an identifier of the sharing instance, and any descriptive text available related to the digital media asset. In some embodiments, the digital media assets are only downloaded from the content and configuration server 110 at the time when they are to be displayed on the digital image display device 10, and are not stored locally in the non-volatile storage block 22 in the digital image display device 10. In some embodiments, the digital media assets are stored in non-volatile storage block 22 using a cache mechanism and the digital media assets are retrieved from the non-volatile storage block 22 if the digital media asset is stored in the non-volatile storage block 22 and has not been updated on the content and configuration server 110, and further, if the digital media asset is not stored in the non-volatile storage block 22 the central processor 20 retrieves the digital media asset from the content and configuration server 110 and stores the asset into the cache mechanism stored on the non-volatile storage block 22. The details of the data cache mechanism will be familiar to one knowledgeable in the arts.

The user can add content to the digital image display device 10 by using a web browser upload sharing method via the web pages user interface block 124 to upload digital images and other digital media assets to the web page server 120. The web page server 120 then stores these digital media assets and appropriate metadata.

In obtain configuration information step 265, the digital image display device 10 communicates with the content and configuration server 110 in order to retrieve configuration information. The configuration information includes settings such as the type of slideshow transition, the time interval for displaying each slideshow image, and the time of day to automatically turn the digital image display device 10 on and off.

In some embodiments, factory default configuration information is stored on the content and configuration server 110 automatically when a digital image display device 10 is registered. The user can utilize the web pages user interface block 124 to modify the configuration information. Additionally, configuration information can be modified by a system administrator using the administration configuration user interface 122, in order to address any service related issues or to provide updates.

The user can use the web pages user interface block 124 to permit E-mail transfer of digital media assets to their particular digital image display device 10. In this case, the user enters a specific E-mail address to enable content to be sent to their digital image display device 10. When E-mail is sent (typically by others) to that address on the E-mail server 140, the digital images and other relevant content is extracted from the E-mail and transferred to the digital image and metadata content storage 130. Metadata about the sender, sharing date, etc. is also stored in association with this content.

The user can also use the web pages user interface block 124 to configure their digital image display device 10 to receive digital media assets that are provided from one or more content providing systems 150 through various external services on the Internet. There are two primary mechanisms for how content is transferred from the external content providing systems 150, depending on how the external system operates.

In a first "pull" mechanism, the content and configuration server 110 periodically polls the external content media server 152 to determine whether new external digital image and metadata content 156 is available from external content host 154. If new content is available, the content and configuration server 110 retrieves the metadata for the new content and stores it in the digital image and metadata content storage 130. The original digital media asset data (e.g., still digital image or digital video file) is not transferred. When the digital image display device 10 later retrieves the list of digital media assets to retrieve, the URL for this new digital media asset will point back to the corresponding external content media server 152.

In a second "push" mechanism, the external content media server 152 provides a notification when new external digital image and metadata content 156 is available from external content host 154. In this case, the content and configuration server 110 configures the external content media server 152 to provide a notification whenever relevant additions or changes are made for the content requested. The external content media server 152 then notifies the content and configuration server 110 when content is added, modified or removed. The content and configuration server 110 then updates the digital image and metadata content stored on the digital image and metadata content storage 130 to reflect the new state of the external content providing systems 150. It will be understood that the content and configuration server 110 stores configuration information for a large number of digital image display device 10 units, and that each digital image display device 10 can be configured to permit content to be provided from a number of different external content providing systems 150 (such as Facebook, Flickr, Kodak Gallery, etc.) using "pull" or "push" mechanisms. The obtain and store new content step 260 and the obtain configuration information step 265 are repeated at regular intervals (e.g., every ten minutes) in order to obtain new content for digital image display device 10. In another embodiment, the obtain configuration information step 265 can be initiated by a message being "pushed" from the content and configuration server 110 to the digital image display device 10 that indicated new or updated content may be available on the content and configuration server 110.

As will be described later in reference to FIG. 5, indications of feedback messages selected by a user of the digital image display device 10 via the user input interfaces block 30 (see FIG. 1) are communicated to the content and configuration server 110, which provides the indications of the feedback messages to the content providing system 150 that provided the particular digital media asset associated with the particular feedback message.

In some embodiments, the digital image display device 10 has an "informational" mode as well as a "pictorial digital media asset" mode. The informational mode of digital image display device 10 displays various information, such as news headlines, financial data, advertising, and the like. The information can be displayed instead of, or along with, the pictorial digital media assets. In the latter case, the digital image display device 10 dedicates a portion of the display screen 40 to pictorial display while another portion of the screen is apportioned to informational display. The informational display can be located adjacent to the pictorial display, or can be overlaid on top of the pictorial display. The information to be displayed can be provided using the system depicted in FIG. 3. The types of information to be provided can be configured for a particular user of digital image display device 10 by using the web pages user interface block 124 to select the particular information of interest to the user. This can include information about particular stocks, sport teams, weather reports, news categories, shopping, gambling, etc., which are of interest to the user. In some embodiments, the information can be provided by various information content web servers (not shown) which provide content to the content and configuration server 110. In other embodiments, the digital image display device 10 can communicate directly with the external web sites (not shown) that provide the information, in order to receive and display web pages, using a web browser implemented in the digital image display device 10.

Figure 5:
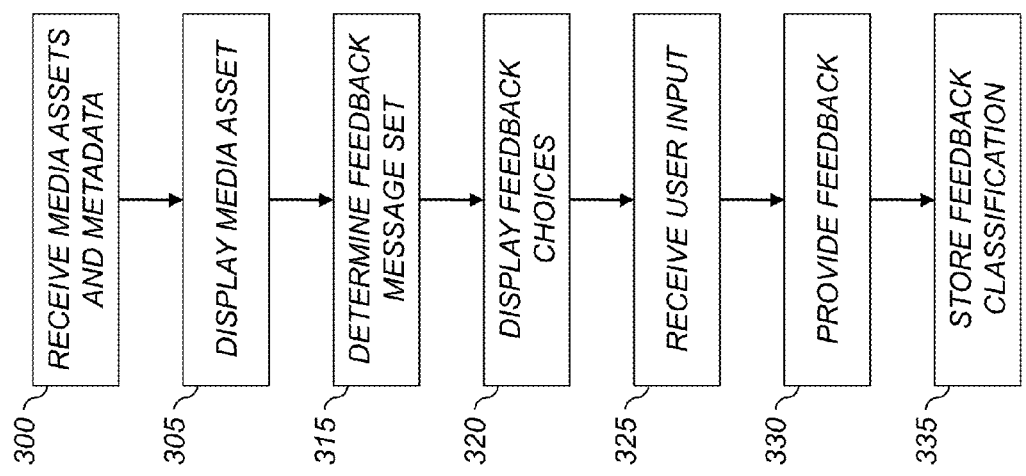
FIG. 5 is a flow diagram showing a method providing a feedback message in accordance with the present invention.

FIG. 5 is a flow diagram showing a method for providing classified feedback to image sharers who provided digital media assets that are displayed on the digital image display device 10 (FIG. 1). In receive media assets and metadata step 300, the digital image display device 10 receives a set of digital media assets and associated metadata, generally from a variety of individuals. The digital media assets are received using the network connection provided by the network interface 34 (FIG. 1). In a preferred embodiment, the received digital media assets and metadata are stored in a memory of the digital image display device 10, for example using the non-volatile storage 22 (FIG. 1) or using a storage media attached to media interface block 32 (FIG. 1).

In order to receive images from a variety of individuals, the user can use the web pages user interface block 124 (FIG. 3) to provide an E-mail address for their digital image display device 10. This E-mail address can be provided to friends and family members. The friends and family members can then send E-mails to the E-Mail address, which will be received by E-mail server 140 (FIG. 3). The E-mails can include digital media assets, such as digital still images or digital videos. E-mails sent by different individuals to the E-Mail address for the digital image display device 10 are designated as being provided by different sources. In some embodiments, the particular source (i.e., the individual who provided the digital media assets) can be identified by the E-mail address that was used to send the E-mail (e.g., a "sent by" E-mail address or a "reply to" E-mail address). The content and configuration server 110 (FIG. 3) can then use the "sent by" or "reply to" address in order to automatically identify the individual who provided the asset. An indication of the feedback message which is selected by the user of the digital media display device 10 when the image is later displayed can be provided by sending an email message to the "sent by" or "reply to" email address.

The identity of the individual is stored as metadata along with the asset in digital image and metadata content storage 130 (FIG. 3). It will be understood that each E-mail received by the image display device 10 can provide a single image, or a plurality of images. The content and configuration server 110 can also store metadata that identifies the E-mail message that provided the assets, so that a plurality of images provided by the same E-mail message can be associated together as a single "sharing instance."

The user can also use the web pages user interface block 124 to enable their digital image display device 10 to receive digital media assets that are provided from one or more content providing systems 150 (FIG. 3), using various external services on the Internet. For example, the user can select the Kodak Gallery website, or a website associated with other on-line content storage systems and services. In addition to selecting the content providing system, the user can use web pages user interface block 124 to select the account name(s) used to store the digital media assets that are to be provided to the digital image display device 10. In some embodiments, the user can use the web pages user interface block 124 to select digital media assets matching additional search criteria in order to select only a subset of the digital media assets associated with a particular account name. Examples of search criteria that can be used in accordance with the present invention would include search criteria to identify digital media assets included in a specified album, digital media assets associated with a specified keyword, digital media assets that include one or more specified persons or objects, digital media assets that were captured at a specified capture location, digital media assets that were captured within a specified date range, digital media assets that were received within a specified date range, or digital media assets were received with a specified sharing method.

The content providing systems 150 selected by user can include, for example, social networking websites such as Facebook and MySpace, or digital image sharing websites such as Kodak Gallery or Snapfish. In some embodiments, the user can use web pages user interface block 124 to select particular "friends". The assets that these "friends" upload to their account on the social network website can then be automatically provided to the digital image display device 10 under the control of content and configuration server 110. It will be understood that each "friend" on the social network website serves as a different source of digital media assets. It will also be understood that the indications of the feedback message provided to different social networking websites can use particular communications formats specified by each of the different social media networking websites, so that the feedback messages are appropriately displayed by the social networking website.

In some embodiments, the digital image display device 10 can be in continuous communication with the content and configuration server 110. In other embodiments, the digital image display device 10 can instead connect and communicate with the content and configuration server 110 on an occasional basis, for example every ten minutes, or every hour, or when digital media assets are pushed down from the content and configuration server 110, or when the user manually initiates a connection operation, or when the user has selected a feedback message on the digital image display device 10.

The digital image display device 10 receives digital media assets (e.g., digital still images and digital video images) and metadata from the content and configuration server 110 via the network interface block 34, and stores the digital media assets and metadata in the non-volatile storage block 22, or using a storage media attached to media interface block 32. The metadata can be stored using a variety of formats. For example, the metadata (including feedback classification metadata) can be included in the image files, or can be stored separately from the image files (such as in a database file), or can be stored both in the image files and in a separate database. The metadata enables the stored digital media assets to be grouped according to the individual "source" that supplied the asset. The metadata also enables the stored digital media assets be grouped according to their origin (upload, E-mail, Facebook, Kodak Gallery, etc.). The metadata also enables the stored assets to be grouped according to a "feedback classification", an "album" or a "sharing instance". It will be understood that the stored assets can be grouped or selected using a combination of different types of metadata, such as by grouping or selecting all of the assets having a common feedback classification which were shared within a particular time period.

Figure 6:
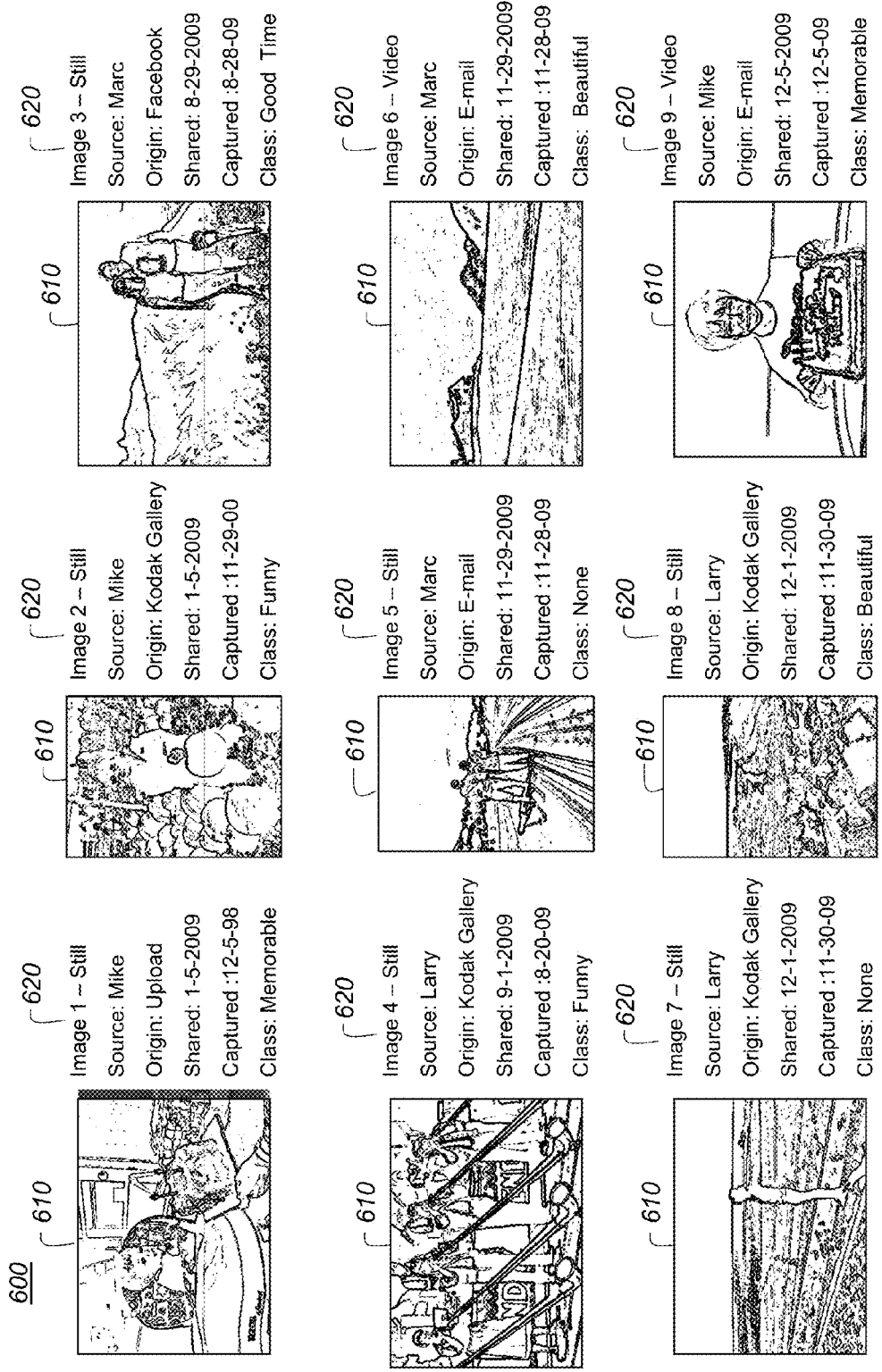
FIG. 6 depicts a collection of digital images and metadata stored in the digital media frame.

FIG. 6 depicts a collection of digital media assets 600 stored in the digital image display device 10, including nine particular digital media assets 610, and some of the associated metadata 620. The digital media assets 610 include two digital video clips (Images 6 and 9) and seven digital still images (Images 1-5 and 7-8). It will be understood that the digital image display device 10 typically stores a much larger number of digital media assets 610, for example several hundred or several thousand digital media assets 610.

Each of the digital media assets 610 depicted in FIG. 6 has associated metadata 620. The metadata 620 includes a digital media asset identifier (e.g., "Image 1"), and a digital media asset type (e.g., "still" or "video"). The metadata 620 also includes a digital media asset source (e.g., "Mike" or "Larry") providing an indication of the person who provided the asset, and a digital media asset sharing method providing an indication of the sharing method by which the digital media asset was provided. For example, sharing methods can include an E-mail sharing method (i.e., "E-mail"), social networking website sharing methods (e.g., "Facebook"), digital image sharing website sharing methods (e.g., "Kodak Gallery"), web browser upload sharing methods or direct network upload sharing methods. The metadata 620 also includes a sharing date ("Shared"), which gives the date on which the digital media asset was transferred to the digital image display device 10, as well as a capture date ("Captured"), which is the date that the digital media asset 610 was captured by a digital camera, or scanned by a digital image scanner. The capture date metadata can be provided, for example, by the date/time metadata included in the well-known Exif-JPEG image format when the digital media asset 610 was captured by a digital camera.

The metadata 620 also includes a feedback classification which indicates the feedback classification associated with the feedback message selected by the user of the digital media display device 10 for the digital media asset 610. The feedback classifications include, for example, "memorable", "funny", "beautiful", and "good time". If the user has not selected a feedback message for a particular digital media asset 610, the feedback classification defaults to "none".

It will be understood that many other types of metadata 620 can be stored in association with the digital media assets 610 stored in the digital image display device 10. This metadata 620 can include, for example, the names of people pictured in the digital media assets 610, which can be provided either manually by users, or using a face recognition algorithm. Likewise, the metadata 620 can include the names of objects pictured in the digital media assets 610 or capture locations for the digital media assets 610. The metadata 620 can also include album names, event names, captions, keywords and the like. Additionally, the metadata may include comments or feedback associated with the digital image which was provided by other individuals using other systems such as Facebook or Flickr, through the content providing system 150.

Returning to a discussion of FIG. 5, in display media asset step 305, the digital image display device 10 displays one of the digital media assets on the display screen 40 (FIG. 1). The digital media asset that is displayed by the display media asset step 305 can be selected in a variety of ways. For example, the displayed digital media asset can be the next digital media asset in a particular playlist of digital media assets. The digital media assets in the playlist can be displayed sequentially in the form of a "slideshow." Playlists can be selected by the user of the digital image display device 10 in a various ways. For example, the user can select from a set of predefined playlists using a graphical user interface. In some embodiments, the graphical user interface can enable the user to define a playlist including digital media assets that were provided by a specific individual, or to define a playlist including digital media assets that have been classified using feedback messages have the same feedback classification. In some embodiments, when new digital media assets are received by the digital image display device 10, they are immediately displayed, or used to form a playlist of recently added digital media assets.

Figure 7:
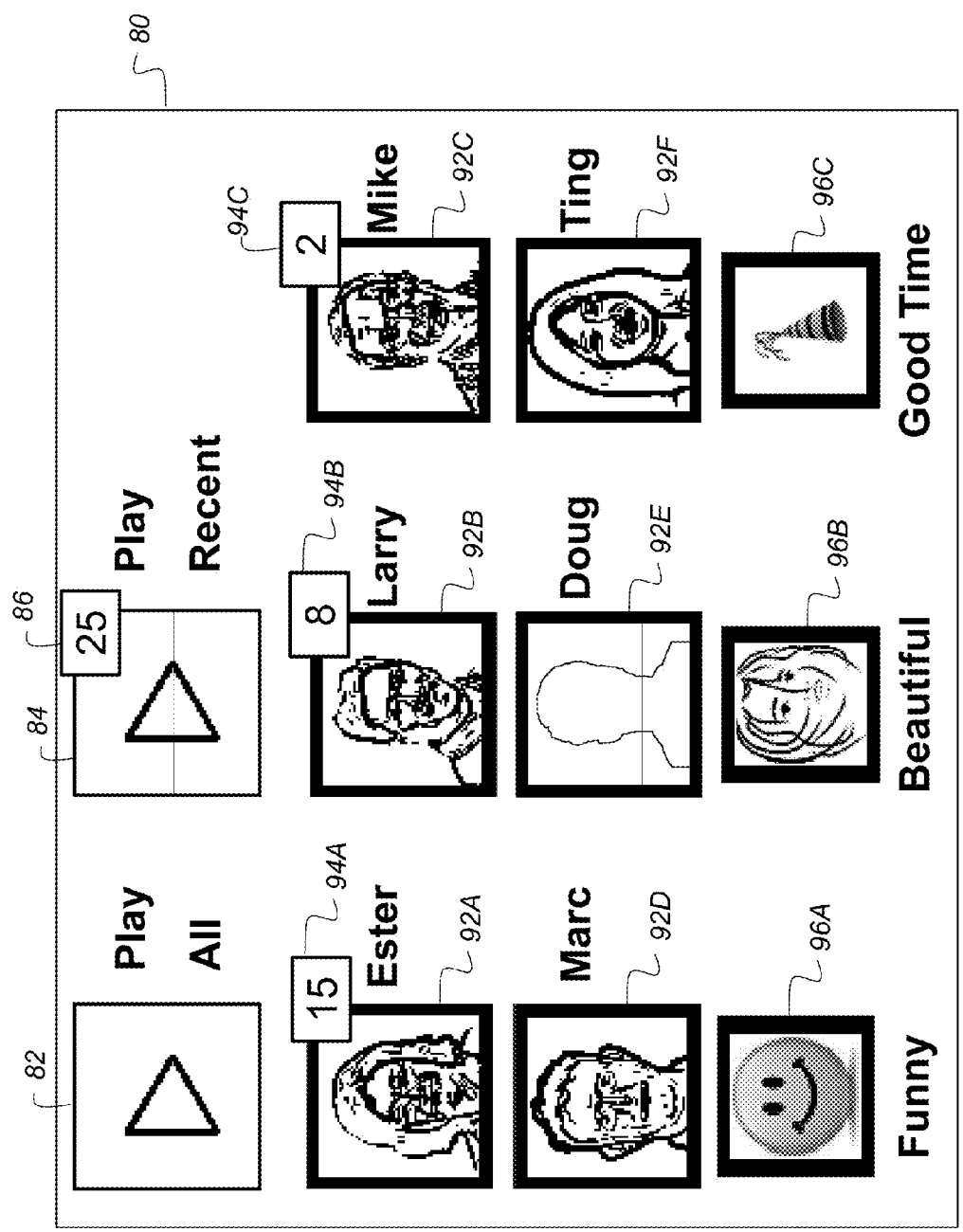
FIG. 7 is a graphical user interface for selecting subset of an image collection provided by particular individuals or sharing an asset classification.

FIG. 7 shows an example of a graphical user interface 80 that can be displayed on the display screen 40 (FIG. 1). The graphical user interface 80 includes a "Play all" icon 82, which can be selected by the user in order to display a playlist including all of the digital media assets stored in the digital image display device 10. The graphical user interface 80 also includes a "Play recent" icon 84, which can be selected by the user in order to display only those assets that have recently been received by the digital image display device 10. The time period for determining recently received images can be a factory default value (e.g., digital media assets received during the last 10 days), or can be a time period selected by the user in association with obtain configuration information step 265 (FIG. 4B). The method for determining recently received images can also be specified by a number of most recently received digital media assets to display (e.g., the last 100 digital media assets received), which could be a factory default value or a value selected by the user association with obtain configuration information step 265. The number of recently received digital media assets is displayed in recently received assets box 86.

The example graphical user interface 80 shown in FIG. 7 includes six icons 92A-92F, which represent six different individuals who have supplied the digital media assets currently stored in the digital image display device 10. The user of the digital image display device 10 can select one of the icons 92A-92F in order to initiate a slideshow of the images provided by the individual associated with the icon. The icons 92A-92F can include a small photo of the individual, such as the photo of Ester used for icon 92A. The icon photos can be uploaded or selected by the user, using the web pages user interface 124, when the user enables the digital image display device 10 to receive digital media assets from various sources. For example, the icon photo for an individual who is enabled to provide images from a Facebook account can be derived from their current Facebook page profile image. In some embodiments, the central processor 20 in the digital image display device 10 can enable the user to select and crop one of the stored digital still images in order to provide a small photo of an individual who has provided digital media assets. If a small photo of a particular individual is not available, a generic icon can be used, such as for icon 92E.

It will be understood that in order to display a larger number of icons (e.g., 30 icons) for a larger number of individuals, a subset (e.g., 6 icons) of the total number of icons can be displayed, along with appropriate navigation icons that enable the user to scroll through the larger number of icons.

The icons 92A-92F can be displayed using an order such that individuals who have most recently shared digital media assets are shown nearer the top of the graphical user interface 80. In some embodiments, the number of digital media assets recently received from each individual can be displayed, as shown in recently received assets boxes 94A, 94B, and 94C, which are associated with the corresponding icons 92A, 92B, and 92C. For example, recently received assets box 94C indicates that two digital media assets have been recently received from Mike.

The example graphical user interface 80 shown in FIG. 7 also includes three icons 96A-96C, which represent three different user feedback classifications. Icon 96A corresponds to the "funny" feedback classification, icon 96B corresponds to the "beautiful" feedback classification, and icon 96C corresponds to the "good time" feedback classification. Each icon can include a graphic image depicting the feedback classification. For example, the icon 96A for the "funny" feedback classification includes a "smiley face" graphic image. The user of the digital image display device 10 can select one of the icons 96A-96C in order to initiate a slideshow of the images that have been labeled with a feedback message corresponding to a particular feedback classification. For example, the user of the digital image display device 10 can select the "funny" icon 96A in order to initiate a slideshow which includes assets where the feedback "class" metadata 620 (see FIG. 6) has a value of "funny". As will be discussed further with regard to FIGS. 10A and 10B, the actual feedback messages provided for the digital media assets that are associated with a particular feedback classification (e.g., funny) may be different depending on the user or the asset classification.

It will be understood that some embodiments can also include graphical user interface elements that enable the user to select digital media assets that include particular people, albums, stories, events, or capture time periods. This can enable the user to select a subset of the digital media assets provided by a particular individual, or having a particular feedback classification, for display as a slide show. For example, after the user selects one of the icons 92A-92F, or one of the icons 94A-94C, an additional graphical user interface can be invoked to enable the user to select a particular album name, a capture time period, and the like. In such an embodiment, only the digital media assets from the selected individual, or having a particular feedback classification, or both, which are associated with the selected album or time period will then be displayed, unless the user subsequently overrides this selection by selecting a "display all" icon in order to display all images from the selected individual.

Returning to a discussion of FIG. 5, in determine feedback message step 315, the central processor 20 in the digital image display device 10 determines a particular set of classified feedback message choices from a plurality of different sets of classified feedback choices. In some embodiments, the particular set of classified feedback message choices are determined responsive to the individual who provided the displayed digital media asset, which can be determined using the "source" metadata 620 in FIG. 6. The individual feedback messages of the different sets of classified feedback message choices are mapped to a uniform set of feedback classifications. This enables different feedback "dialects" to be used for different individuals, while also enabling the feedback to be used for other purposes.

For example, some individuals will understand that a feedback message of "LOL" means "laughing out loud", but some other individuals will not understand the meaning of this message. Therefore, for these other individuals, a feedback message of "really funny!" is more appropriate. Since both the "LOL" feedback message and the "really funny!" feedback message are mapped to the same feedback classification (e.g., "funny"), they will both be selected as "funny" assets when the "funny" icon 96A (see FIG. 7) is selected, even though different feedback messages were provided to the two different individuals who shared the two different images.

The determination of the particular set of feedback message choices is responsive to one or more feedback message set criteria. Such feedback message set criteria may have been provided during initial configuration of the digital image display device 10 or may be dynamically generated responsive to the current state of the digital image display device 10, or responsive to data acquired over the network interface 34.

Figure 8A:
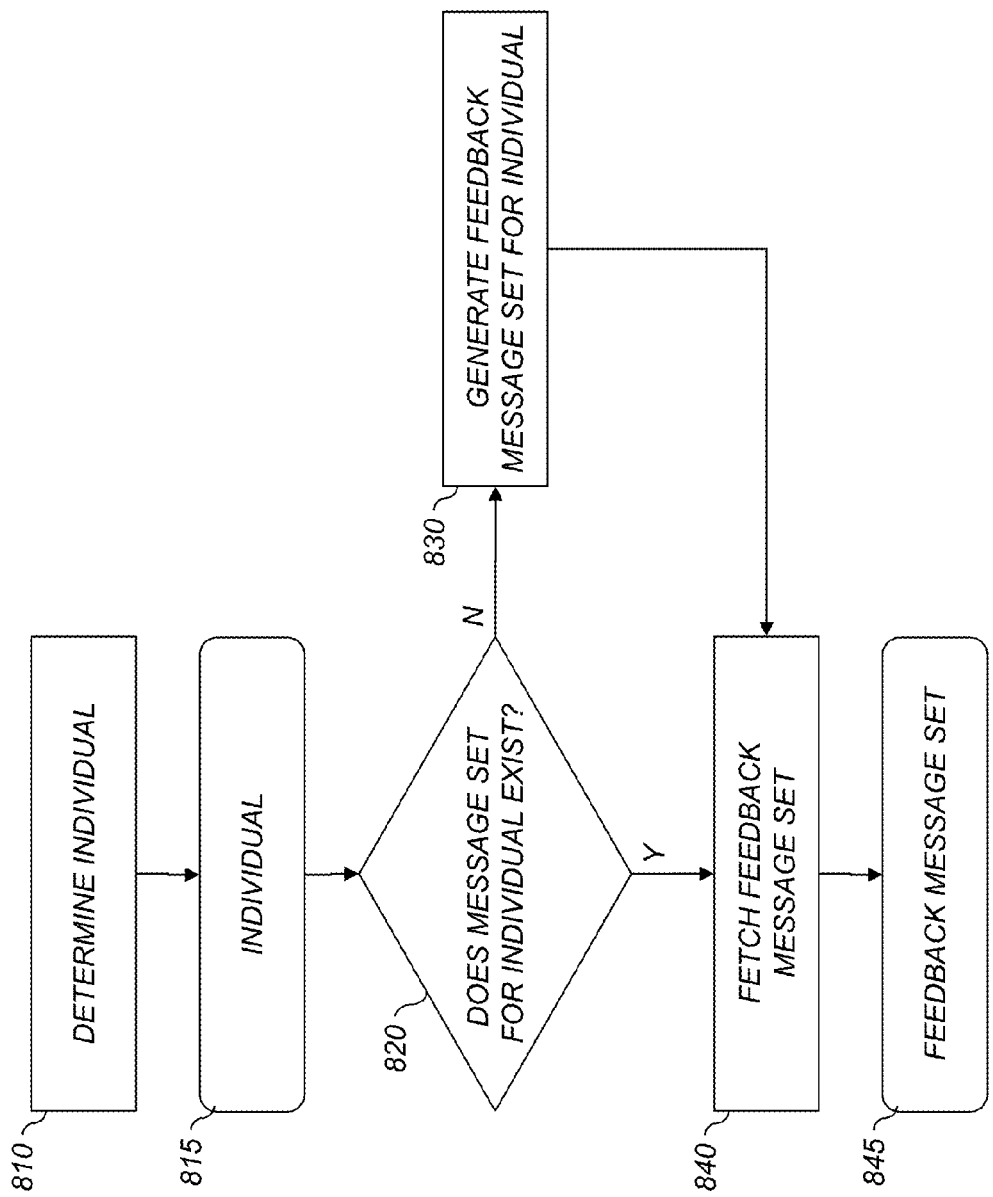
FIG. 8A depicts a flow diagram of a method for providing a set of feedback message choices specific to the sharer of a digital media asset.

FIGS. 8A and 8B, depict two possible embodiments of methods to determine a particular set of classified feedback message choices. One skilled in the art will recognize that the digital image display device 10 may alternatively be configured to use other methods to determine a particular set of classified feedback messages, including a variation or combination of the methods depicted in FIGS. 8A and 8B.

In the method of FIG. 8A, the feedback message set is determined responsive to the individual who provided the digital media asset. In determine individual step 810, an individual 815 who shared the digital media asset is determined using metadata associated with the displayed digital media asset. In some embodiments, the metadata is retrieved in the image metadata and content storage 130 (FIG. 3). A message set for individual test 820 attempts to locate a previously generated message set associated with the determined individual 860. The message set may be located in the non-volatile storage 22 (FIG. 1) or retrieved over the network interface 34 (FIG. 1). If a feedback message set for the determined individual 815 is not found, then the method proceeds to a generate feedback message set for individual step 830. In one embodiment, the generate feedback message set for individual step 830 is performed in the digital image display device 10. In another embodiment, the generate feedback message set for individual step 830 is performed by requesting (over the network interface 34) that a remote system generate the feedback message set. The remote system can be any network device, computer, or system accessible over the network interface 34.

Embodiments of generate feedback message set for individual step 830 can include analysis of previous feedback messages left on other digital images shared by the determined individual 815, analysis of the relationship of the user to the determined individual 815, frequency analysis of words or phrases, heuristic analysis, or natural language processing. Such embodiments may require identification of the user of the digital image display device 10, which may be accomplished by use of supplied login credentials, fingerprint scanning, facial recognition, or other user identification means (not shown) that may be available to the digital image display device 10.

Regardless of whether the feedback message set for individual 815 already existed or was generated, a fetch feedback message set step 840 is used to retrieve the identified feedback message set 845 (e.g., from the non-volatile storage 22 or over the network interface 34).

In the method of FIG. 8B, the feedback message set is responsive to one or more aspects of the displayed digital media asset. In some embodiments, a retrieve metadata step 850 is used to retrieve metadata associated with the displayed digital media asset, for example from image metadata and content storage 130 (FIG. 3). An asset classification 860 for the displayed digital media asset can then be determined from the retrieved metadata. For example, the metadata for many digital media assets includes a label providing an asset classification related to the scene content (e.g., children, animal, sunset, nature scene, birthday party or beach vacation). These can be used to identify a corresponding asset classification 850. The digital media assets can also be classified according to other types of classification schemes related to various digital media asset attributes. For example, the digital media asset attributes can include asset type (e.g., digital still image or digital video), asset source (e.g., camera model), camera settings (e.g., capture mode, exposure time, flash fired), capture time/date, capture location (e.g., GPS coordinates) or capture conditions (e.g., scene brightness).

In some embodiments, an analyze asset step 855 is used to analyze the pixel data of the displayed digital media asset in order to determine the asset classification 860 for the displayed digital media asset. The analysis can use one or more digital image analysis techniques in order to determine additional metadata from the pixel data of the image. These digital image analysis techniques can include, for example, semantic analysis, feature point identification, color map identification, facial identification, facial recognition, age recognition, and color or light balance analysis. The additional metadata can include, for example, an event classification, or other information about the digital media asset including the number of persons depicted in the image, the approximate age of one of more of the persons depicted in the image, or whether an animal or flower appears in the image. Examples of scene classifiers that can be used in accordance with the present invention are described in U.S. Pat. No. 6,282,317 to Luo et al., entitled: "Method for automatic determination of main subjects in photographic images"; U.S. Pat. No. 6,697,502 to Luo, entitled "Image processing method for detecting human figures in a digital image"; U.S. Pat. No. 6,504,951 to Luo et al., entitled "Method for detecting sky in images"; U.S. Patent Application Publication 2004/0037460 to Luo et al., entitled; "Method for detecting objects in digital images"; U.S. Patent Application Publication 2005/0105775 to Luo, entitled "Method of using temporal context for image classification"; and U.S. Patent Application Publication 2005/0105776 to Luo, entitled "Method for semantic scene classification using camera metadata and content-based cues", all of which are incorporated herein by reference.

In some embodiments, the digital image analysis is performed responsive to other image metadata, such as geographic location metadata or time/date metadata. For example, the digital image analysis can use a database related to landmarks at different geographic locations, and the pixel data of the received image can be analyzed to determine if any of the objects depicted in the image are likely to be one of the landmarks in the vicinity of the geographic location metadata associated with the received digital image, such as the Washington monument in Washington, D.C.

U.S. Pat. No. 6,810,146 to Loui, entitled "Method and system for segmenting and identifying events in images using spoken annotations," and U.S. Pat. No. 7,120,586 to Loui, entitled "Method and system for segmenting and identifying events in images using spoken annotations," disclose other methods for determining an asset classification that can be used in accordance with the present invention. This method involves extracting information from spoken annotations.

A message set for asset classification test 865 determines whether a previously generated feedback message set exists for the determined asset classification 860. The feedback message set may be located in the non-volatile storage 22 (FIG. 1) or retrieved over the network interface 34 (FIG. 1). If a feedback message set for the asset classification is not found, then the method proceeds to a generate feedback message set for asset classification step 870.

In some embodiments, the generate feedback message set for asset classification step 870 is performed by the central processor 20 in the digital image display device 10. In other embodiments, the generate feedback message set for asset classification step 870 is performed by requesting over the network interface 34 that a remote system generate the feedback message set. Embodiments of the generate feedback message set for asset classification step 870 can include analysis of previous feedback messages left on digital media asset of the same asset classification 860, frequency analysis of words or phrases, heuristic analysis, or natural language processing.

Regardless of whether a feedback message set for the asset classification 860 already existed or was generated, the fetch feedback message set step 840 is used to retrieve the feedback message set 845 (e.g., from the non-volatile storage 22 or over the network interface 34).

Returning to a discussion of FIG. 5, a display feedback choices step 320 is used to display a set of classified feedback message choices associated with the determined feedback message set 845 (FIG. 8A) on the display screen 40 (FIG. 1) which were determined in determine feedback message step 315. As a result, different sets of classified feedback message choices are displayed responsive to the determined feedback message set 845.

Figure 9:
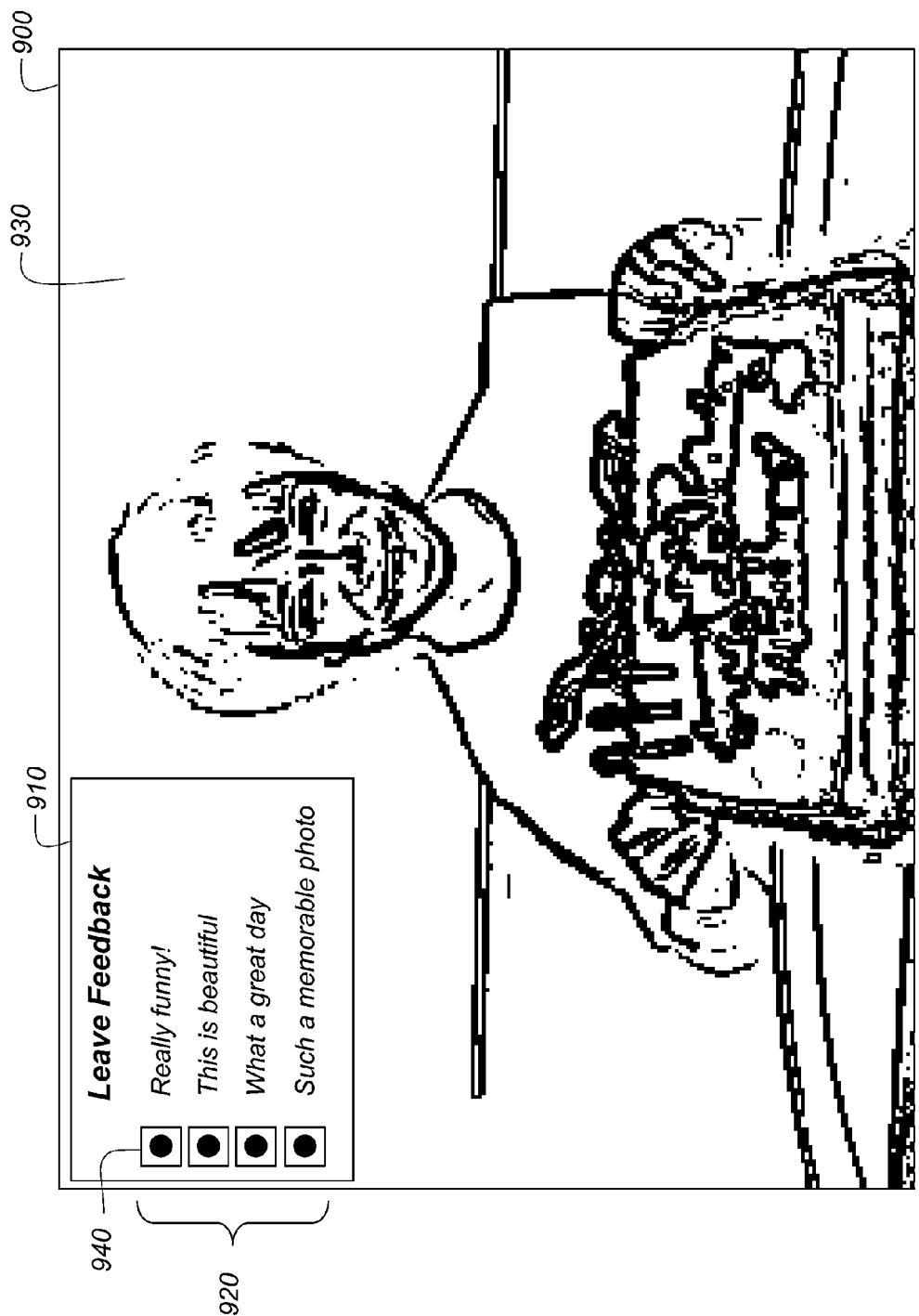
FIG. 9 depicts a graphical user interface for providing a set of feedback message choices in accordance with the present invention.

FIG. 9 shows an example of a user interface 900 providing a set of feedback message choices for a displayed digital media asset 930. The user interface 900 includes a feedback message choice selection area 910 that displays a set of feedback message choices 920. The feedback message choice selection area 910 may be a fixed or floating, opaque or semi-transparent overlay on the displayed digital media asset 930. In another embodiment, the feedback message choice selection area 910 is displayed in a region of the display screen 40 (FIG. 1) separate from the region used to display the digital media asset. In yet another embodiment, the feedback message choice selection area 910 is displayed on a separate display or display device (not shown). The particular set of feedback message choices 920 shown in feedback message choice selection area 910 of FIG. 9 have been determined for individuals who are family members, as will be described later in reference to FIG. 10A. A selectable user interface button 940 is shown to the left of the text for each of the feedback message choices 920.

Returning to a discussion of FIG. 5, a receive user input step 325 is used to receive input from the user of the digital image display device 10, using appropriate user input interfaces 30 (FIG. 1), to select a particular feedback message choice. For example, the user can select the user interface button 940 corresponding to the desired feedback message choice 920 on the user interface 900 of FIG. 9. It will be understood that the digital image display device 10 may employ other types of user input interfaces 30 that can be used by the user to select a particular one of the set of feedback message choices. For example, in some embodiments arrow navigation keys and a selection key can be used to navigate to and select the icon for a feedback message. In other embodiments, the digital image display device 10 can include a microphone and voice recognition algorithm, and the user could speak one or more words related to a particular feedback message choice.

A provide feedback step 330 is used to provide an indication of the selected feedback message choice to the individual who provided the displayed digital media asset, or to an account associated with the individual who provided the displayed digital media asset. Digital media assets shared over the network interface 34 have the identification of the sharing individual as well as the sharing service (e.g. Facebook, Flickr, or Kodak Gallery) available as part of the digital media asset metadata. In one embodiment, the shared digital media asset's sharing service is Facebook, which provides a public application programming interface (Facebook API) for posting feedback messages for a Facebook supplied image. The selected feedback message would be supplied to Facebook by the digital image display device 10 over the network interface 34 using the Facebook API.

In store feedback classification step 335, the feedback classification corresponding to the selected feedback message choice is stored as metadata associated with the displayed digital media asset. In some embodiments, the metadata is stored in non-volatile storage block 22 of digital image display device 10 in FIG. 1. In alternative embodiments, the metadata can be stored on the content and configuration server 110 (FIG. 3). In some embodiments, the metadata is encoded using terms which identify the feedback classifications. These terms can include, for example, the terms "funny", "memorable", "beautiful", and "good time"

described earlier in reference to metadata 620 in FIG. 6. In other embodiments, the metadata is encoded using a list of values corresponding to the feedback classifications. For example, a value of "1" can indicate a "funny" feedback classification, a value of "2" can indicate a "memorable" feedback classification, a value of "3" can indicate a "beautiful" feedback classification, and a value of "4" can indicate a "good time" feedback classification.

The metadata which encodes the feedback classification can be associated with a particular digital media asset by writing the encoded feedback classification as metadata in the image file which contains the particular digital media assets, for example using a TIFF tag within an Exif image file. Alternatively, the metadata which encodes the feedback classification can be associated with a particular digital media asset by storing the encoded feedback classification value in a file, or a database entry, which is separate from, but associated with, the digital media asset file which contains the particular digital media asset.

In accordance with the present invention, different sets of classified feedback messages are used to provide feedback to different sets of persons. In this way, the feedback messages that are provided can be tailored to the characteristics or preferences of different individuals. FIG. 10A depicts two sets of classified feedback message sets for two different types of individuals that can be used in accordance with the method of FIG. 8A. A friend feedback message set 400 is used for a group of friends, and a family feedback message set 450 is used for family members. The example classified feedback message sets include four different feedback classifications: a "funny" feedback classification 410A, a "beautiful" feedback classification 410B, a "good time" feedback classification 410C, and a "memorable" feedback classification 410D. The classified feedback message sets define feedback icons and feedback text for each of the feedback classification 410A-410D.

The friend feedback message set 400 includes a set of feedback icons 420A-420D and a set of feedback texts 430A-430D, corresponding to a set of feedback classifications 410A-410D. Likewise, the family feedback message set 450 includes a set of feedback icons 460A-460D and a set of feedback texts 470A-470D, corresponding to the same set of feedback classifications 410A-410D. In this example, the friends for whom the friend feedback message set 400 is used are the friends of a young adult. Consequently, the classified feedback message choices selected for friends use an informal communications style or dialect including slag terms, such as the "LOL" feedback text 430A for digital media assets that are funny, and the "Party on!" feedback text 430C for digital media assets which depict a good time (whether or not the assets were captured at a party).

On the other hand, the family feedback message set 450 is used for family members, such as parents and relatives. It uses a more conservative communications style or dialect, such as the "Really funny!" feedback text 470A for digital media assets that are funny, and the "What a great day" feedback text 470C for digital media assets which depict a good time. Likewise the feedback icons 460A-460D used for family members and more conservative than the feedback icons 420A-420D used for friends.

It will be understood that in some embodiments, not all feedback messages (feedback icons or feedback text) provided in the feedback message set will be different for the different message sets. For example, both the friend feedback message set 400 and the family feedback message set 450 use the same feedback text 430D and 470D for the memorable feedback classification 410D.

In some embodiments, a user interface can be supplied to allow the user to assign the feedback messages (e.g., the feedback icons and the feedback text) that are associated with the feedback classifications for a particular feedback message set. A set of different feedback icon choices and feedback message choices can be provided that the user can choose from using the user interface. Alternately, the user can be enabled to type in their own custom feedback message or load their own custom feedback icons. In some embodiments, the user interface can be supplied to allow the user to define their own feedback message sets and to define the individuals or asset classifications that should be associated with those sets. For example, a user may desire to define several different variations of "friend" feedback message sets, one for "college friends" and one for "neighborhood friends" to reflect the fact that these groups may use different slang terminologies. In some embodiments, sets of classified feedback message choices can also be defined for sets of individuals sharing a common interest such as a hobby, a job or a club. In some embodiments, feedback messages may only be defined for a subset of the available feedback message choices for a particular feedback message set. For example, it might not make sense to define a "funny" feedback message for a "sunset" asset classification.

Similarly, FIG. 10B depicts two sets of classified feedback message sets for two different asset classifications that can be used in accordance with the method of FIG. 8B. A birthday party feedback message set 500 is provided for use with digital media assets having a "birthday party" asset classification, and a nature scene feedback message set 550 is provided for use with digital media assets having a "nature scene" asset classification. The example classified feedback message sets use the same feedback classifications 410A-410D that were used for the feedback message sets of FIG. 10A. The classified feedback message sets define feedback icons 520A-520D and 560A-560D and feedback text 530A-530D and 570A-570D for each of the feedback classification 410A-410D. The feedback messages are customized to be relevant to the asset classification.

It will be understood that the methods for providing classified feedback can be provided using systems other that the one depicted in FIG. 3. For example, a personal computer connected to the Internet can be used to obtain digital media assets and metadata from a variety of individuals that are provided, for example, by E-mail server 140 or content providing systems 150 such as Facebook. The personal computer can display a digital media asset and provide a particular set of classified feedback choices from a plurality of different sets of classified feedback message choices. The personal computer can then receive input from the user, via any user interface included as part of the personal computer, so that the user can select a particular one of the set of classified feedback message choices. The personal computer can then use its network connection to provide an indication of the selected feedback message to the individual who provided the digital media asset, or to an account associated with the individual who provided the digital media asset.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

PARTS LIST 10 digital image display device
20 central processor
21 real-time clock
22 non-volatile storage block
24 buffer memory block
30 user input interfaces block
31 user buttons
32 media interface block
33 interface connector
34 network interface block
40 display screen
42 display compensation block
44 speaker(s)
46 audio codec block
50 power supply
52 frame surround
54 sliders
80 graphical user interface
82 play all icon
84 play recent icon
86 recently received assets box
92A icon
92B icon
92C icon
92D icon
92E icon
92F icon
94A recently received assets box
94B recently received assets box
94C recently received assets box
96A icon
96B icon
96C icon
102 routing server
104 action logging server
106 authentication server
110 content and configuration server
120 web page server
122 administration configuration interface
124 web pages user interface
130 digital image and metadata content storage
140 E-mail server
150 content providing system
152 external content media server
154 external content host
156 external digital image and metadata content
200 obtain list of digital media assets step
205 read next digital media asset step
210 decompress data step
215 resize image for display step
220 compensate image data for display step
225 display image step
230 respond to user interface inputs step
235 wait to display next digital media asset step
250 identify server(s) step
255 obtain security code token step
260 obtain and store new content step
265 obtain configuration information step
300 receive media assets and metadata step
305 display media asset step
315 determine feedback message set step
320 display feedback choices step
325 receive user input step
330 provide feedback step
335 store feedback classification step
400 friend feedback message set
410A feedback classification
410B feedback classification
410C feedback classification
410D feedback classification
420A feedback icon
420B feedback icon
420C feedback icon
420D feedback icon
430A feedback text
430B feedback text
430C feedback text
430D feedback text
450 family feedback message set
460A feedback icon
460B feedback icon
460C feedback icon
460D feedback icon
470A feedback text
470B feedback text
470C feedback text
470D feedback text
500 birthday party feedback message set
520A feedback icon
520B feedback icon
520C feedback icon
520D feedback icon
530A feedback text
530B feedback text
530C feedback text
530D feedback text
550 nature scene feedback message set
560A feedback icon
560B feedback icon
560C feedback icon
560D feedback icon
570A feedback text
570B feedback text
570C feedback text
570D feedback text
600 collection of digital media assets
610 digital media asset
620 metadata
810 determine individual step
815 individual
820 message set for individual test
830 generate feedback message set for individual step
840 fetch feedback message set step
845 feedback message set
850 retrieve metadata step
855 analyze asset step
860 asset classification
865 message set for asset classification test
870 generate feedback message set for asset classification step
900 user interface
910 feedback message choice selection area
920 feedback message choices 930 displayed digital media asset
940 user interface button

The invention claimed is:

1. A digital image display device configured to display a collection of digital media assets, the device comprising:
a display screen;
a processor;
a network connection configured to receive digital media assets provided by an individual and to provide feedback related to the received digital media assets to the individual;
an image memory configured to store the received digital media assets together with metadata associated with the received digital media assets;
a user interface configured to receive input from a user of the digital image display device; and
a processor-accessible program memory storing executable instructions configured to cause the processor to:
receive a digital media asset and associated metadata via the network connection;
store the received digital media asset in the image memory;
display the received digital media asset on the display screen;
determine an asset classification for the displayed digital media asset;
select a particular set of feedback message choices from different sets of feedback message choices responsive to the determined asset classification, wherein the different sets of feedback message choices are mapped to a common set of feedback classifications, and wherein each respective different set of feedback message choices is expressed by different representations that are tailored to a respective asset classification;
display the particular set of feedback message choices on the display screen,
receive input from the user of the digital image display device via the user interface to select a particular one of the set of feedback message choices; and
provide an indication of the selected feedback message to the individual who provided the digital media asset.

2. The digital image display device of claim 1 wherein the asset classification provides an indication of scene content for the displayed digital media asset.

3. The digital image display device of claim 1 wherein the asset classification is determined by analyzing digital image data for the displayed digital media asset to characterize the scene content.

4. The digital image display device of claim 3 wherein the analysis of the digital image data includes semantic analysis, feature point identification, color map identification, facial identification, facial recognition, age recognition, and color or light balance analysis.

5. The digital image display device of claim 1 wherein the asset classification is determined responsive to the metadata associated with the displayed digital media asset.

6. The digital image display device of claim 5 wherein the metadata provides an indication of scene content for the displayed digital media asset.

7. The digital image display device of claim 5 wherein the metadata provides an indication of asset type, asset source, camera settings, capture time/date, capture location or capture conditions.

8. The digital image display device of claim 1, wherein the instructions are further configured to cause the processor to store the feedback classification corresponding to the selected feedback message as metadata associated with the displayed media asset.

9. The digital image display device of claim 8 wherein the feedback classification stored as metadata is used as part or all of a selection criteria for selecting a subset of a collection of digital media assets.

10. The digital image display device of claim 9 wherein the subset of the collection of digital media assets is displayed as a slideshow on the digital image display device.

11. The digital image display device of claim 1 wherein user interface is configured to enable the user to assign custom feedback messages to the feedback classifications for a particular set of feedback message choices.

12. The digital image display device of claim 1 wherein the digital media asset is received using an E-mail sharing method, a social networking website sharing method, a digital image sharing website method, a web browser upload sharing method or a direct network upload sharing method.

13. The digital image display device of claim 1 wherein the received digital media asset is a digital still image or a digital video image captured using a digital camera, or a scan of photographic prints or film captured using a digital image scanner.

14. The digital image display device of claim 1 wherein the network connection is a wireless network connection.

15. The digital image display device of claim 1 wherein the user interface includes a touch screen, a pointing device, one or more buttons, a remote control, a gesture recognition interface or a voice recognition interface.

16. The digital image display device of claim 1 wherein at least some of the displayed feedback choices are represented using icons.

17. The digital image display device of claim 1 wherein at least some of the displayed feedback choices are represented using feedback text.

18. The digital image display device of claim 1 wherein the user interface includes a touch screen interface and the feedback choices are represented using icons displayed on the touch screen interface, and wherein the user provides input by touching the icon corresponding to the particular one of the feedback messages.

19. A method for providing a classified feedback message related to a digital media asset, comprising:
receiving, via a network connection, a digital media asset, together with associated metadata, wherein the digital media asset is provided by an individual on a remote system;
storing the received digital media asset in an image memory;
displaying the received digital media asset on a display screen;
determining an asset classification for the displayed digital media asset;
selecting a particular set of feedback message choices from different sets of feedback message choices responsive to the determined asset classification, wherein the different sets of feedback message choices are mapped to a common set of feedback classifications, and wherein each respective different set of feedback message choices is expressed by different representations that are tailored to a respective asset classification;
displaying the particular set of feedback message choices on the display screen;

receiving input from the user of the digital image display device via the user interface to select a particular one of the set of feedback message choices; and using the network connection to provide an indication of the selected feedback message to the individual who provided the digital media asset.

20. A non-transitory computer-readable medium having instructions stored thereon that, upon execution by a processing system, cause the processing system to perform operations comprising:

receiving a digital media asset, together with associated metadata, wherein the digital media asset is provided by an individual on a remote system;

storing the received digital media asset in an image memory;

displaying the received digital media asset on a display screen;

determining an asset classification for the displayed digital media asset;

selecting a particular set of feedback message choices from different sets of feedback message choices responsive to the determined asset classification, wherein the different sets of feedback message choices are mapped to a common set of feedback classifications, and wherein each respective different set of feedback message choices is expressed by different representations that are tailored to a respective asset classification;

displaying the particular set of feedback message choices on the display screen;

receiving input from the user of the digital image display device via the user interface to select a particular one of the set of feedback message choices; and providing an indication of the selected feedback message to the individual who provided the digital media asset.

\* \* \* \* \*